United States Patent
Makino et al.

(10) Patent No.: US 12,088,545 B2
(45) Date of Patent: Sep. 10, 2024

(54) CONTROL DEVICE AND NON-TRANSITORY COMPUTER READABLE MEDIUM STORING CONTROL PROGRAM

(71) Applicant: FUJIFILM Business Innovation Corp., Tokyo (JP)

(72) Inventors: Yohei Makino, Kanagawa (JP); Tsuyoshi Toda, Kanagawa (JP); Kiyoshi Yasukawa, Kanagawa (JP); Satoshi Maruyama, Kanagawa (JP); Ryoto Yabusaki, Kanagawa (JP); Ryo Matsumoto, Kanagawa (JP); Takafumi Haruta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/301,963

(22) Filed: Apr. 17, 2023

(65) Prior Publication Data

US 2023/0254273 A1    Aug. 10, 2023

Related U.S. Application Data

(62) Division of application No. 16/574,027, filed on Sep. 17, 2019, now Pat. No. 11,671,391.

(30) Foreign Application Priority Data

Sep. 25, 2018    (JP) .................................. 2018-178621

(51) Int. Cl.
*H04L 51/18*    (2022.01)
*H04L 51/02*    (2022.01)
(Continued)

(52) U.S. Cl.
CPC .............. *H04L 51/18* (2013.01); *H04L 51/02* (2013.01); *H04L 51/046* (2013.01); *H04L 51/216* (2022.05); *H04L 51/224* (2022.05)

(58) Field of Classification Search
None
See application file for complete search history.

(56) References Cited

U.S. PATENT DOCUMENTS

| | | | |
|---|---|---|---|
| 9,325,651 B2 | 4/2016 | Sakuta et al. | |
| 10,038,656 B2 | 7/2018 | Zheng et al. | |

(Continued)

FOREIGN PATENT DOCUMENTS

| | | |
|---|---|---|
| CN | 103338256 | 10/2013 |
| CN | 104009908 | 8/2014 |

(Continued)

OTHER PUBLICATIONS

"Office Action of China Counterpart Application", issued on Jan. 31, 2024, with English translation thereof, p. 1-p. 20.

*Primary Examiner* — Chris Parry
*Assistant Examiner* — Abderrahmen Chouat
(74) *Attorney, Agent, or Firm* — JCIPRNET

(57) ABSTRACT

A control device includes a control unit that performs detects a post file in a group chat. The control unit is configured to not to execute processing using the posted file in a case where the post file posted from any user in the group chat, in which a plurality of users and a chatbot participate, is not shared among the users participating in the group chat; and execute the processing using the posted file in a case where the post file is shared among the users.

3 Claims, 15 Drawing Sheets

(51) Int. Cl.
*H04L 51/046* (2022.01)
*H04L 51/216* (2022.01)
*H04L 51/224* (2022.01)

(56) References Cited

U.S. PATENT DOCUMENTS

| | | | |
|---|---|---|---|
| 10,165,017 B2 | 12/2018 | Lin et al. | |
| 10,212,107 B2 | 2/2019 | Chen et al. | |
| 10,212,110 B2 | 2/2019 | Lee et al. | |
| 10,572,195 B2 | 2/2020 | Tan et al. | |
| 10,834,037 B2 | 11/2020 | Zheng et al. | |
| 11,025,680 B2 | 6/2021 | Lin et al. | |
| 11,050,689 B2 | 6/2021 | Sun et al. | |
| 2009/0187630 A1* | 7/2009 | Narayanaswami | G06Q 10/107 |
| | | | 709/206 |
| 2014/0207882 A1 | 7/2014 | Joo et al. | |
| 2014/0211232 A1 | 7/2014 | Ganesan et al. | |
| 2015/0281166 A1 | 10/2015 | Woo et al. | |
| 2016/0050263 A1* | 2/2016 | Hwang | H04N 21/234363 |
| | | | 709/204 |
| 2016/0050326 A1* | 2/2016 | Lee | H04N 21/64322 |
| | | | 358/402 |
| 2017/0272390 A1 | 9/2017 | Cohen et al. | |
| 2018/0152411 A1 | 5/2018 | Lee et al. | |
| 2018/0227251 A1* | 8/2018 | Takishima | H04L 51/04 |
| 2020/0234384 A1* | 7/2020 | Wu | G06F 16/9535 |

FOREIGN PATENT DOCUMENTS

| | | |
|---|---|---|
| CN | 104144109 | 11/2014 |
| CN | 105141503 | 12/2015 |
| CN | 105187684 | 12/2015 |
| CN | 105376442 | 3/2016 |
| CN | 105659521 | 6/2016 |
| CN | 107689911 | 2/2018 |
| JP | 2010061251 | 3/2010 |
| KR | 20140099982 | 8/2014 |
| KR | 101573348 | 12/2015 |
| WO | 2017026888 | 2/2017 |

* cited by examiner

FIG. 5

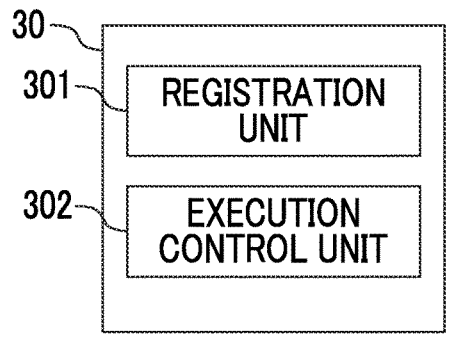

FIG. 6

| USER | IMAGE FORMING APPARATUS | PERSONAL PRINT SETTINGS |
|---|---|---|
| 10A | IMAGE FORMING APPARATUS 40A | DOUBLE-SIDED, COLOR, ⋯ |
| 10B | IMAGE FORMING APPARATUS 40B | SINGLE-SIDED, MONOCHROME, ⋯ |
| ⋮ | ⋮ | ⋮ |

FIG. 7

| TALK ROOM | IMAGE FORMING APPARATUS | PARTICIPATING USER | PRINT SETTINGS FOR TALK ROOM |
|---|---|---|---|
| X | IMAGE FORMING APPARATUS 40A, IMAGE FORMING APPARATUS 40B | USER A | DOUBLE-SIDED, COLOR, ⋯ |
| | | USER B | SINGLE-SIDED, MONOCHROME, ⋯ |
| | | USER C | DOUBLE-SIDED, MONOCHROME, ⋯ |
| | | USER D | SINGLE-SIDED, MONOCHROME, ⋯ |
| Y | IMAGE FORMING APPARATUS 40A | USER A | DOUBLE-SIDED, COLOR, ⋯ |
| | | USER B | SINGLE-SIDED, MONOCHROME, ⋯ |
| | | USER C | DOUBLE-SIDED, COLOR, ⋯ |
| | | USER D | SINGLE-SIDED, MONOCHROME, ⋯ |
| ⋮ | ⋮ | ⋮ | ⋮ |

CONTROL DEVICE AND NON-TRANSITORY COMPUTER READABLE MEDIUM STORING CONTROL PROGRAM

CROSS-REFERENCE TO RELATED APPLICATIONS

This application is a divisional application of application Ser. No. 16/574,027, filed on Sep. 17, 2019, which claims priority under 35 USC 119 from Japanese Patent Application No. 2018-178621 filed Sep. 25, 2018.

BACKGROUND

(i) Technical Field

The present invention relates to a control device and a non-transitory computer readable medium storing a control program.

(ii) Related Art

JP2014-164522A discloses a message notification apparatus including: operation instruction detection means for detecting an operation instruction for operating an external apparatus from a message in a communication service for displaying a message written by a member in time series and specifying the member who has written the message as an instructor of the operation instruction; external apparatus control means for controlling the external apparatus according to the operation instruction detected by the operation instruction detection means; operation result acquisition means for acquiring an operation result of the external apparatus under the control of the external apparatus control means; report message generation means for generating a report message for reporting the operation result acquired by the operation result acquisition means; and report message display means for outputting the report message generated by the report message generation means to a server, which provides the communication service, and displaying the message in the communication service in a state in which the instructor specified by the operation instruction detection means is specified as a destination.

SUMMARY

A software robot (hereinafter, referred to as "chatbot") that executes specific processing based on information posted by a user on a chat is known.

Such a chatbot is designed to execute specific processing (for example, notification of information to the user or control to execute processing desired by the user) associated with predetermined conditions in a case where information posted by the user on the chat satisfies the predetermined conditions.

In the case of classifying chats from the viewpoint of the number of users participating in a chat with a chatbot, chats are classified into an individual chat that is a chat in which one user and the chatbot participate and a group chat that is a chat in which a plurality of users and the chatbot participate.

Since a plurality of users participate in a group chat, in a case where one of the user posts information in the group chat, it cannot be concluded that the post is necessarily directed to the chatbot. Therefore, in a case where the conditions for determining the necessity of execution of specific processing are set to the same conditions as in the case of an individual chat, for example, the chatbot may erroneously recognize a post directed to other users as a post directed to the chatbot and as a result, the set conditions may be satisfied. In this case, contrary to the intention of the user, the chatbot performs an operation relevant to the execution control of the specific processing as the conditions are satisfied.

Aspects of non-limiting embodiments of the present disclosure relate to a control device and a non-transitory computer readable medium storing a control program capable of more suppressing the execution of an operation of a chatbot contrary to the intention of a user than in a case where the conditions for determining the necessity of execution of specific processing by the chatbot are set to be the same as the conditions used in an individual chat, in the case of performing control to execute specific processing based on information posted from a user on a group chat.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control device including a control unit that performs control to execute specific processing associated with first conditions in a case where information posted by a user satisfies the first conditions in an individual chat in which one user and a chatbot participate and that performs control not to execute the specific processing in a case where only the first conditions are satisfied and to execute the specific processing in a case where second conditions different from the first conditions are satisfied in a group chat in which a plurality of users and a chatbot participate.

BRIEF DESCRIPTION OF THE DRAWINGS

Exemplary embodiment(s) of the present invention will be described in detail based on the following figures, wherein:

FIG. 5 is a block diagram showing an example of the functional configuration of the chatbot server;

FIG. 6 shows an example of a table that is registered in a registration unit to show a correspondence relationship between a user and an image forming apparatus;

FIG. 7 shows an example of a table that is registered in a registration unit to show a correspondence relationship between a talk room and an image forming apparatus;

DETAILED DESCRIPTION

Figure 1:
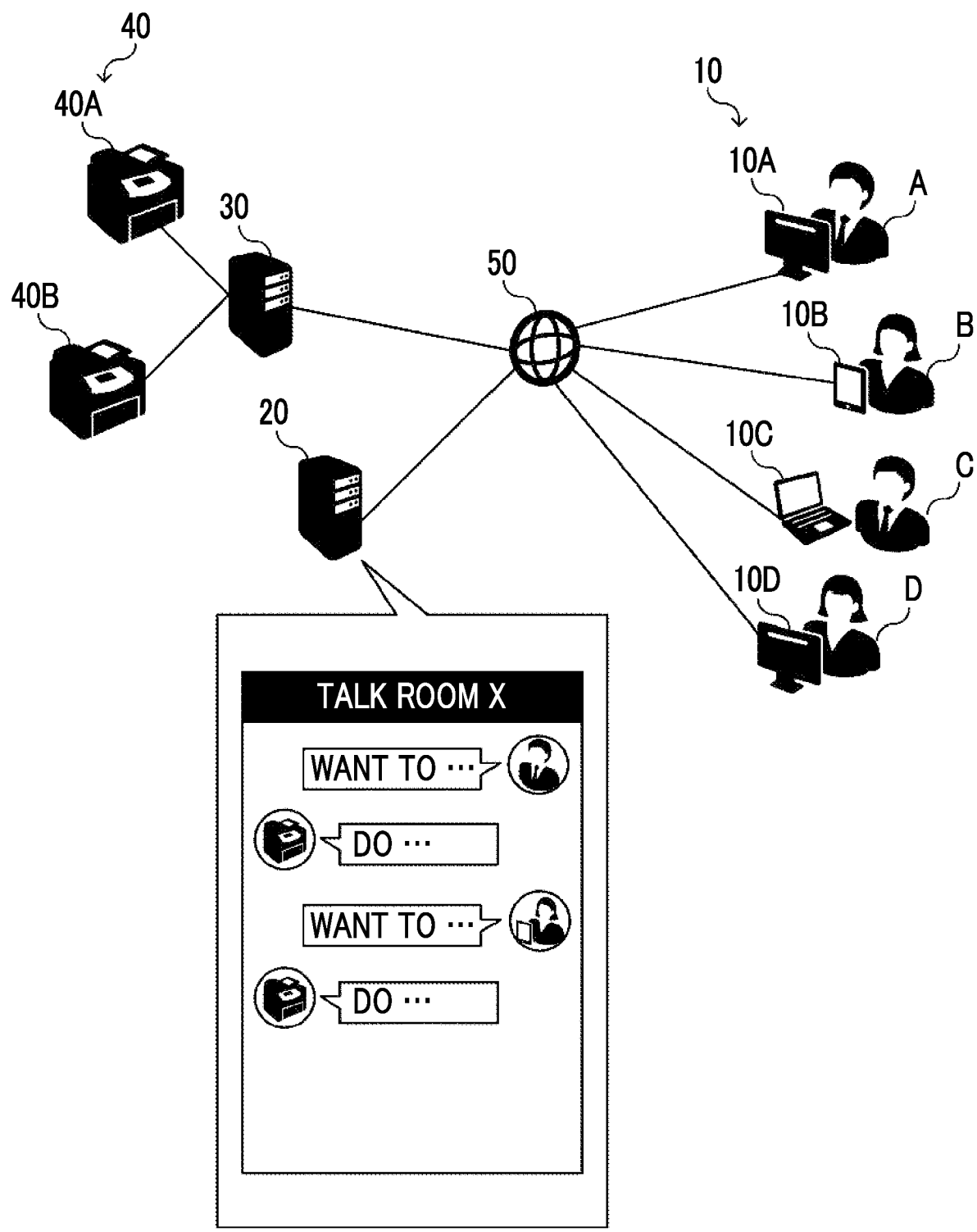
FIG. 1 is a diagram showing the schematic configuration of a control system.

Hereinafter, examples of exemplary embodiments of the present invention will be described with reference to the accompanying drawings. In the drawings, the same or equivalent constituent elements and processes are denoted by the same reference numerals. In addition, the dimensional ratios of the drawings are exaggerated for convenience of explanation and may be different from the actual ratios.

First Exemplary Embodiment

FIG. 1 is a diagram showing the schematic configuration of a control system according to an exemplary embodiment of the present invention.

The control system includes a user terminal 10, a talk room server 20, a chatbot server 30, and an information processing apparatus 40. The user terminal 10, the talk room server 20, and the chatbot server 30 are connected to each other through the Internet 50. The chatbot server 30 is an example of a control device according to the present exemplary embodiment.

The user terminal 10 is a terminal used by a user, and may be any terminal, such as a desktop computer, a notebook computer, a tablet, and a smartphone. In FIG. 1, it is assumed that a user A uses a user terminal 10A, a user B uses a user terminal 10B, a user C uses a user terminal 10C, and a user D uses a user terminal 10D. The user terminals 10A to 10D are collectively referred to as the "user terminal 10".

The talk room server 20 provides a talk room. The talk room is a virtual space in which at least one user and a chatbot, which will be described later, participate so that information indicated by the file posted by the chat can be shared.

Here, the "file" is a unit of data indicating certain information, and the "chat" means that a plurality of members input and exchange information on a computer network in real time or an environment therefor. The "member" includes both a user associated with a real person and a software robot that operates according to specific rules. The "chatbot" is a software robot that performs control to execute specific processing based on information posted by a user on a talk room.

In the talk room, the user can post a file to the user terminal 10. Here, "posting a file" means an act of inputting information in the chat.

The information indicated by the file includes, for example, images or texts. Therefore, in other words, "posting a file" can be said to be an act of inputting various kinds of instructions or information indicated by images and texts in the chat.

In the talk room, users can share information indicated by files, and the chatbot can reply in response to user information. In addition, in the talk room, the user can give an instruction, which is for causing the information processing apparatus 40 to execute specific processing, to the chatbot. For example, the chatbot extracts an instruction included in the information indicated by the posted file by natural language processing and controls the information processing apparatus 40 to execute specific processing. A user and a chatbot can participate in a talk room on a one-to-one basis, or a plurality of users and a chatbot can participate in a talk room.

Hereinafter, a chat that only one user and a chatbot perform by participating in a talk room will be referred to as an "individual chat", and a chat that a plurality of users and a chatbot perform by participating in a talk room will be referred to as a "group chat". There can be a plurality of talk rooms as many as opened talk rooms.

The chatbot server 30 is a server that manages the chatbot. As described above, the chatbot participates in the talk room and responds to information indicated by the file posted by the user, or causes the information processing apparatus 40 to execute specific processing according to an instruction included in the information.

In a case where information regarding an instruction to cause the information processing apparatus 40 to execute specific processing is posted in the talk room in which the chatbot participates, the chatbot controls the information processing apparatus 40 registered in association with the user participating in the talk room to execute the specific processing. The information processing apparatus 40 may be an apparatus that performs any kind of information processing.

Here, examples of the "information processing" include processing for executing printing from text data, image data, and the like, processing for generating or processing data using materials provided in the information processing apparatus 40, and processing for transmission and reception of data between the information processing apparatus 40 and other apparatuses. Hereinafter, a case where the information processing apparatus 40 is an image forming apparatus and an instruction to execute specific processing is an execution instruction to execute printing will be described as an example.

Since the image forming apparatus is an example of the information processing apparatus 40, the image forming apparatus will also be described with reference numeral 40.

The image forming apparatus 40 is an apparatus that forms an image on a recording medium, such as paper, based on a print job.

In the example of the control system shown in FIG. 1, an image forming apparatus 40A and an image forming apparatus 40B are managed by the chatbot server 30. The image forming apparatus 40A and the image forming apparatus 40B are collectively referred to as an "image forming apparatus 40". In the example shown in FIG. 1, the image forming apparatus 40 is connected to the chatbot server 30. However, the image forming apparatus 40 may be connected to the chatbot server 30 through the Internet 50.

Next, the hardware configuration of the talk room server 20 and the chatbot server 30 will be described.

Figure 2:
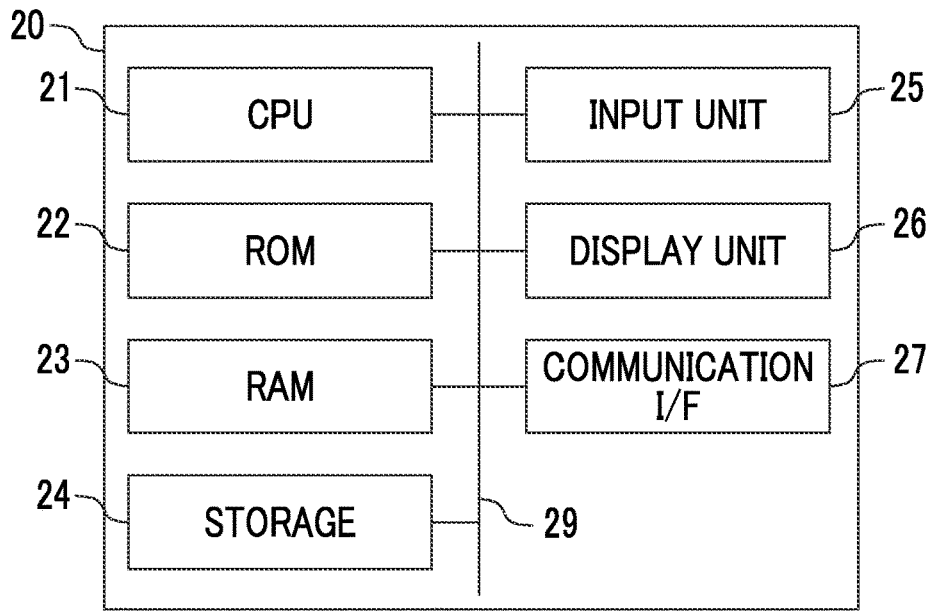
FIG. 2 is a block diagram showing the hardware configuration of a talk room server.

FIG. 2 is a block diagram showing the hardware configuration of a talk room server.

As shown in FIG. 2, the talk room server 20 has components of a central processing unit (CPU) 21, a read only memory (ROM) 22, a random access memory (RAM) 23, a storage 24, an input unit 25, a display unit 26, and a communication interface (I/F) 27. The respective components are communicably connected to each other through a bus 29.

The CPU 21 is a central processing unit, and functions as a control unit that executes various programs or controls each unit. That is, CPU 21 reads a program from the ROM 22 or the storage 24, and executes the program with the RAM 23 as a work area. The CPU 21 performs control and various kinds of arithmetic processing of the above-described components according to the program recorded in the ROM 22 or the storage 24. In the present exemplary embodiment, a talk room providing program for providing a talk room is stored in the ROM 22 or the storage 24.

The ROM 22 stores various programs and various kinds of data. The RAM 23 temporarily stores a program or data as a work area. The storage 24 is a hard disk drive (HDD) or a solid state drive (SSD), and stores various programs including an operating system and various kinds of data.

The input unit 25 includes a pointing device, such as a mouse, and a keyboard, and is used to perform various kinds of input.

The display unit 26 is, for example, a liquid crystal display, and displays various kinds of information. A touch panel type display unit 26 may be used, so that the display unit 26 functions as the input unit 25. The communication I/F 27 is an interface for communicating with other apparatuses through the Internet 50. For example, standards, such as Ethernet (registered trademark), FDDI, and Wi-Fi (registered trademark), are used.

Figure 3:
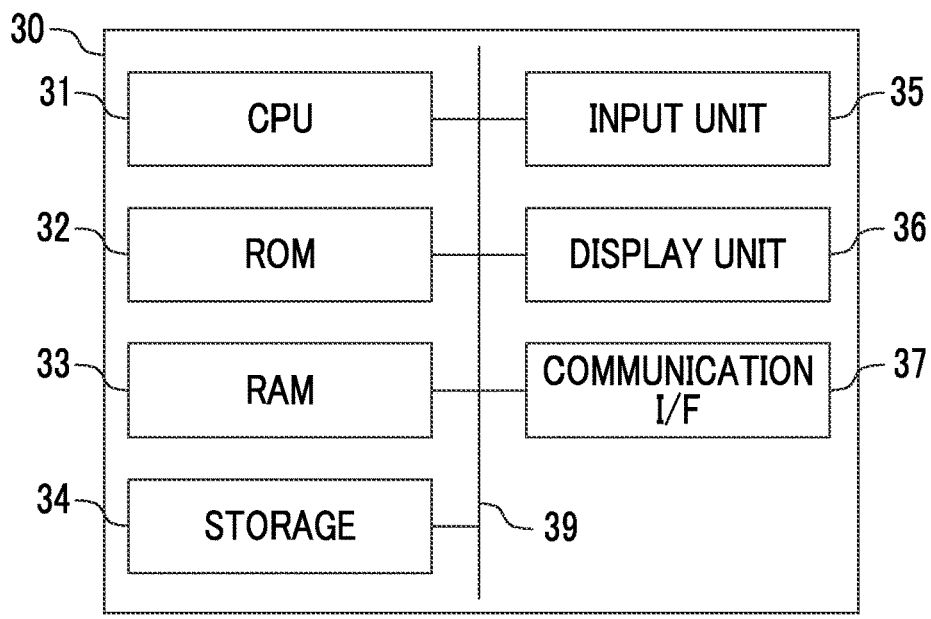
FIG. 3 is a block diagram showing the hardware configuration of a chatbot server.

FIG. 3 is a block diagram showing the hardware configuration of a chatbot server.

As shown in FIG. 3, the chatbot server 30 has components of a CPU 31, a ROM 32, a RAM 33, a storage 34, an input unit 35, a display unit 36, and a communication I/F 37. The respective components are communicably connected to each other through a bus 39. Each component of the chatbot server 30 has the same function as each component of the talk room server 20 in FIG. 2.

Next, the functional configuration of the talk room server 20 and the chatbot server 30 will be described.

Figure 4:
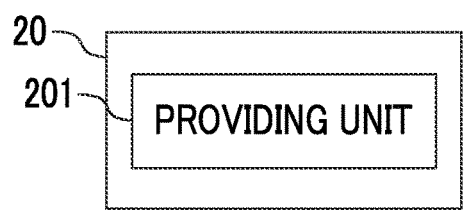
FIG. 4 is a block diagram showing an example of the functional configuration of the talk room server.

FIG. 4 is a block diagram showing an example of the functional configuration of the talk room server 20.

As shown in FIG. 4, the talk room server 20 has a providing unit 201 as a functional configuration. The functional configuration is realized by the CPU 21 that reads a talk room providing program stored in the ROM 22 or the storage 24 and loads the talk room providing program to the RAM 23 to execute the talk room providing program.

The providing unit 201 provides a talk room in which a user can participate and post a file. The talk room server 20 provides a talk room in which an individual chat is performed and a talk room in which a group chat is performed using the function of the providing unit 201.

A plurality of talk rooms can be opened according to the opening request from the user. For example, in a case where a certain user accesses the talk room server 20 to make a talk room opening request and opens a specific talk room, the user who is a creator can invite another user to the opened talk room so that the user participates in the opened talk room. Alternatively, a user participating in the talk room can invite another user not participating in the talk room to the talk room so that the user newly participates in the talk room.

FIG. 5 is a block diagram showing an example of the functional configuration of the chatbot server 30. FIG. 6 shows an example of a table that is registered in a registration unit 301 to show a correspondence relationship between a user and the image forming apparatus 40. FIG. 7 shows an example of a table that is registered in the registration unit 301 to show a correspondence relationship between a talk room and the image forming apparatus 40.

As shown in FIG. 5, the chatbot server 30 has the registration unit 301 and an execution control unit 302 as a functional configuration. The functional configuration is realized by the CPU 31 that reads a control program stored in the ROM 32 or the storage 34 and loads the control program to the RAM 33 to execute the control program.

For example, as shown in FIG. 6, the registration unit 301 registers a correspondence table in which a user and the image forming apparatus 40 are associated with each other. In the example of the correspondence table shown in FIG. 6, print settings used in the case of executing printing are further associated with each user.

In addition, for example, as shown in FIG. 7, the registration unit 301 registers a correspondence table in which a talk room and the image forming apparatus 40 are associated with each other. In the example of the correspondence table shown in FIG. 7, a user participating in a talk room is further associated with each talk room, and print settings in the talk room are further associated with each user. In a case where a user participates in a talk room in which group chat is performed, the correspondence table shown in FIG. 7 is formed by registering the image forming apparatus 40, which is associated with the participating user in the correspondence table shown in FIG. 6, in association with the talk room in which the user participates.

That is, the correspondence table shown in FIG. 6 is used in an individual chat. On the other hand, the correspondence table shown in FIG. 7 is used in a group chat. In each chat, in a case where there is no instruction regarding print settings from the user, information to be printed is printed by the image forming apparatus 40 according to the print settings for each user set in the correspondence table corresponding to the type of chat.

Hereinafter, the print settings for each user registered in advance in the correspondence tables shown in FIGS. 6 and 7 are referred to as "standard print settings".

The execution control unit 302 participates in a talk room as a chatbot. Then, in the talk room, in a case where the conditions for causing the image forming apparatus 40 to print an image are satisfied, the execution control unit 302 acquires information of the image forming apparatus 40, which is associated with the user who has posted the image, and the standard print settings from the correspondence table and controls the image forming apparatus 40 designated by the acquired information to execute printing according to the acquired standard print settings. As described above, the execution control unit 302 is an example of a control unit according to the present exemplary embodiment.

Next, the operation of the chatbot server 30 according to the present exemplary embodiment will be described.

Figure 8:
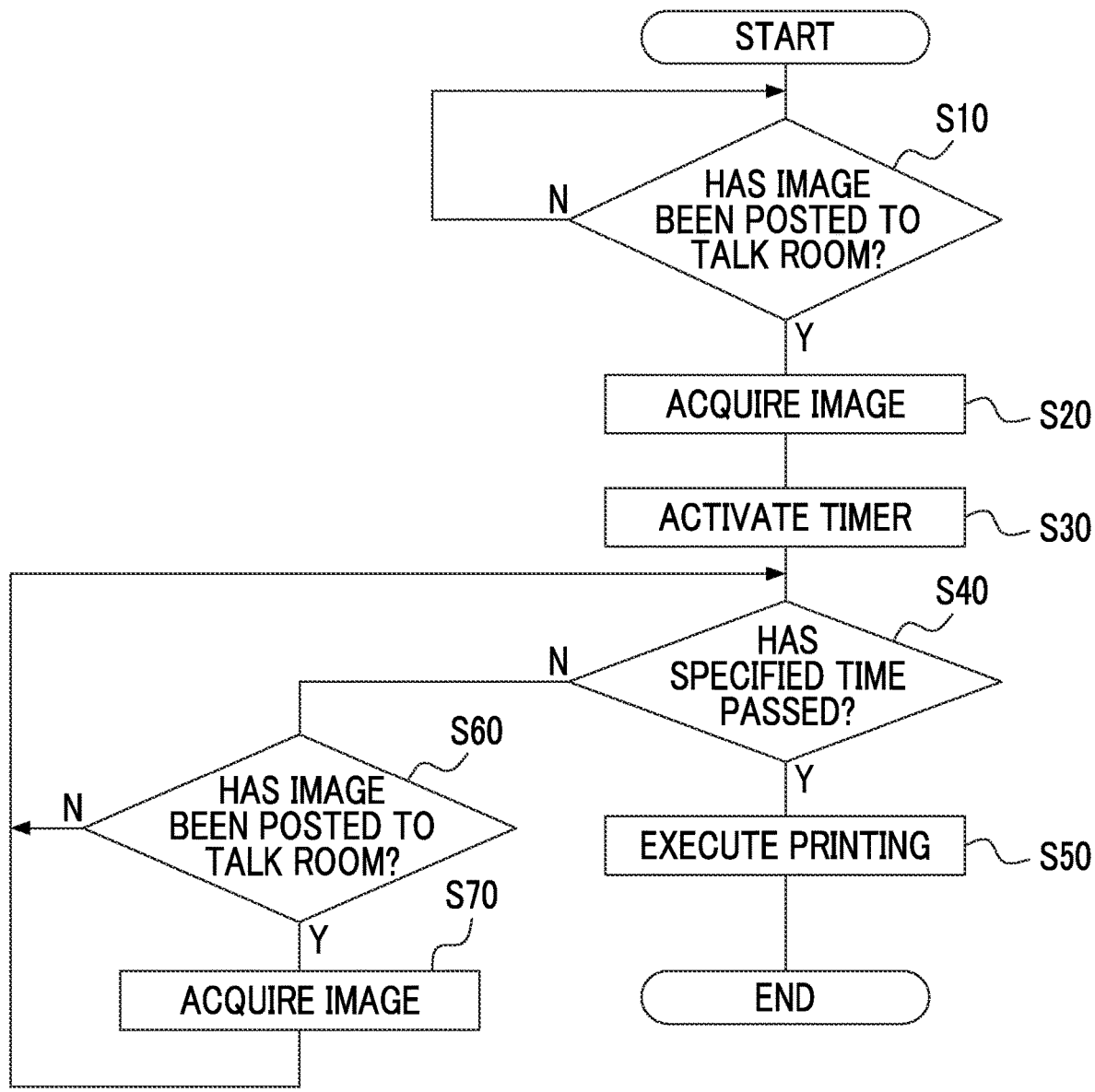
FIG. 8 is a flowchart showing an example of the flow of specific processing in an individual chat.

FIG. 8 is a flowchart showing an example of the flow of specific processing executed by the CPU 31 in a case where the chatbot server 30 participates in an individual chat. The specific processing shown in FIG. 8 is an example of specific processing in the chatbot server 30.

A control program for defining the specific processing shown in FIG. 8 is stored in advance in the ROM 32 of the chatbot server 30, for example. The CPU 31 of the chatbot server 30 reads the control program stored in the ROM 32 and executes the specific processing.

First, in step S10, the CPU 31 determines whether or not a file including an image has been posted to the talk room by a participating user.

In a case where a file including an image is not posted, the determination processing of step S10 is repeatedly executed to monitor posting of a file including an image. Hereinafter, for convenience of explanation, the "file including an image" will be simply referred to as an "image".

On the other hand, in a case where an image has been posted by the user, the process proceeds to step S20.

In the individual chat in which the chatbot server 30 that controls the image forming apparatus 40 to perform printing and the user participates on a one-to-one basis, the act of posting an image to the talk room by the user corresponds to an execution instruction that is an instruction to print an image posted to the talk room. Therefore, in step S20, the CPU 31 acquires the image posted by the user and stores the image in the RAM 33 as a print target.

In step S30, the CPU 31 activates a timer for measuring the elapsed time. Activation of the timer is realized by using, for example, a timer function built into the CPU 31. In this manner, the elapsed time after the image is posted to the talk room is measured.

In step S40, the CPU 31 determines whether or not the value of the activated timer exceeds a specified time set in advance. The specified time is a time that corresponds to an example of the first time according to the present exemplary embodiment and is set in consideration of further posting of another image by the user. For example, the specified time is stored in advance in the storage 34. There is no limitation on the value of the specified time, and the value of the specified time may be set to any value.

In a case where the value of the timer does not exceed the specified time, the process proceeds to step S60.

In step S60, the CPU 31 determines whether or not another image different from the image posted in step S10 has been posted to the talk room by the user.

In a case where no other images have been posted, the process returns to step S40 to monitor whether or not the value of the timer exceeds the specified time.

On the other hand, in a case where another image has been posted, the process proceeds to step S70. In step S70, the CPU 31 acquires the image posted by the user and stores the image in the RAM 33 as a print target in the same manner as in step S20, and the process proceeds to step S40.

That is, the CPU 31 treats the image posted by the user during the specified time as an image posted by the user with the intention of printing.

In a case where it is determined that the value of the timer exceeds the specified time in the determination processing of step S40, the process proceeds to step S50.

In step S50, the CPU 31 controls the image forming apparatus 40, which is associated with the user who has posted the image, to print the image set as a print target according to the standard print settings associated with the user who has posted the image with reference to the correspondence table shown in FIG. 6 that is used in the case of individual chat. As described above, the specific processing shown in FIG. 8 is ended. In addition, while participating in the individual chat, the CPU 31 resumes the specific processing shown in FIG. 8 to monitor posting of the next image by the user.

That is, in the case of individual chat, the chatbot server 30 executes printing of an image in a case where the image is posted to the talk room by the user. For the chatbot server 30, posting of an image to the talk room in the individual chat is the conditions set to execute printing of the image, and is an example of the first conditions according to the present exemplary embodiment.

Figure 9:
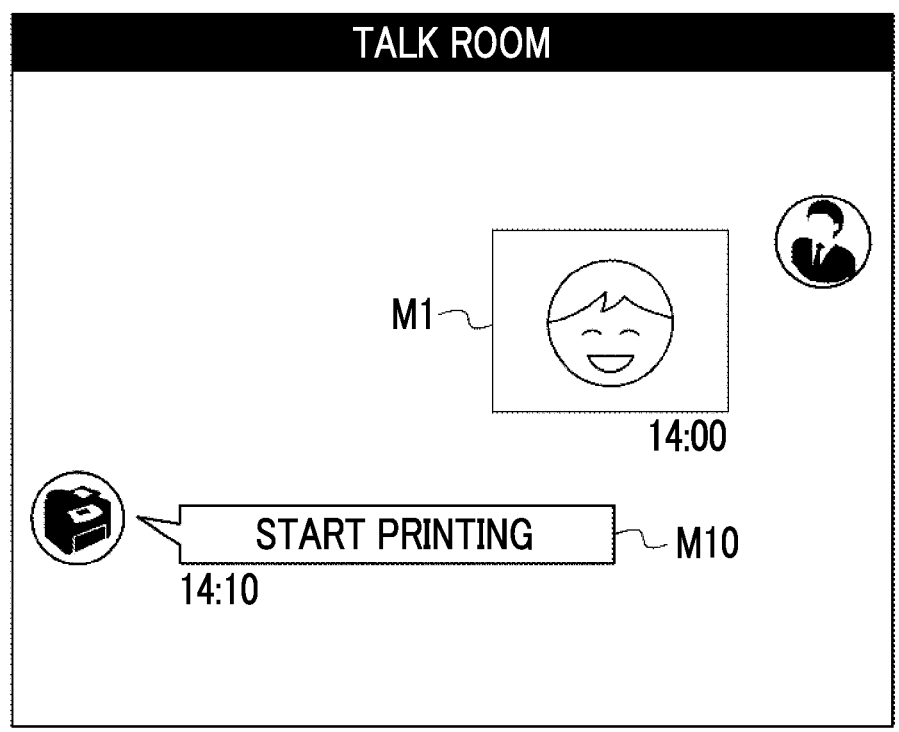
FIG. 9 is a diagram showing an example of a talk room in which an individual chat is performed.

FIG. 9 is a diagram showing an example of a talk room displayed on the screen of the user terminal 10 of a user participating in the individual chat in a case where the specific processing in the individual chat shown in FIG. 8 is executed.

For example, in a case where the specified time is set to 10 minutes, in a case where the user posts an image M1 at 14:00, the chatbot server 30 starts control to execute printing of the image M1 at 14:10 at which the specified time has passed. In addition, for example, in a case where the specified time is set to 0 minute, the chatbot server 30 starts control to execute printing of the image M1 without an interval after the user posts the image M1 at 14:00.

As shown in FIG. 9, in the case of starting control to execute printing, for example, the chatbot server 30 may post information M10 for notifying the user of the processing status of the chatbot server 30, such as "start printing", to the talk room.

Before the control to execute printing is started, the chatbot server 30 may post information for inquiring of the user about print settings to be applied. In a case where the user posts information using the standard print settings, the chatbot server 30 controls the image forming apparatus 40 to print an image according to the standard print settings associated with the user. On the other hand, in a case where the user posts information designating print settings different from the standard print settings, the chatbot server 30 controls the image forming apparatus 40 to print an image according to the print settings designated by the user.

Next, the operation of the chatbot server 30 in a group chat will be described.

In the individual chat, the chatbot server 30 starts control to execute printing of an image in a case where the image is posted to the talk room by the user. However, an image that a certain user posts to the talk room in the group chat is not necessarily an image addressed to the chatbot server 30, but may be an image addressed to another user participating in the talk room. Therefore, also in the group chat, in the same manner as in the individual chat, in a case where the chatbot server 30 starts control to execute printing of an image in a case where the image is posted to the talk room by the user, the user who has posted the image performs an operation of stopping the printing of an image by posting an instruction to stop the start of printing to the chatbot server 30.

That is, in order for the chatbot server 30 to execute an operation according to the intention of the user, the conditions for starting the printing of the image that the user has posted to the talk room in the group chat needs to be set differently from the conditions for starting the printing of the image in the individual chat.

Figure 10:
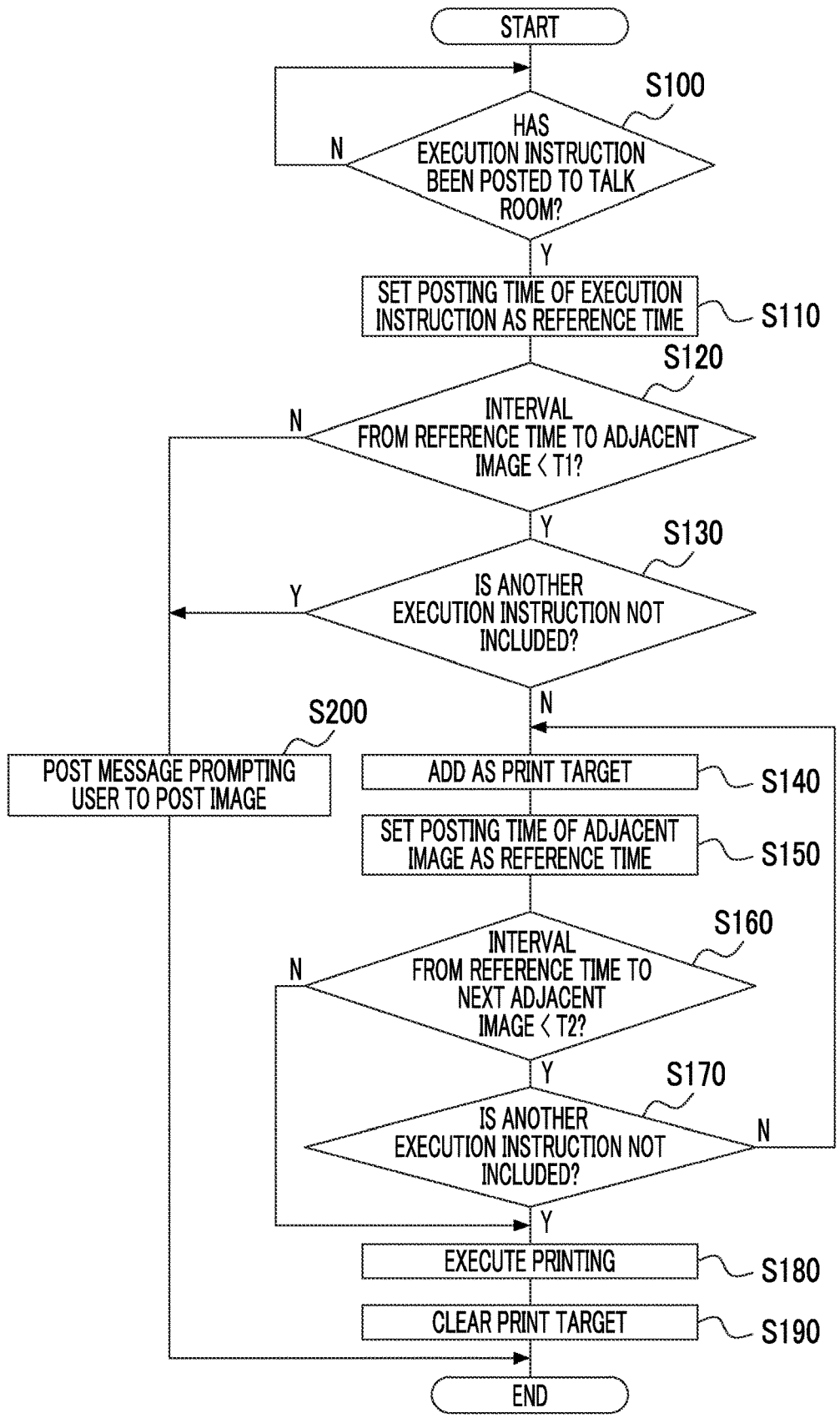
FIG. 10 is a flowchart showing an example of the flow of specific processing executed in the order of posting of an image and posting of an execution instruction in a group chat.

FIG. 10 is a flowchart showing an example of the flow of specific processing executed by the CPU 31 in a case where the chatbot server 30 participates in a group chat. The specific processing shown in FIG. 10 is an example of specific processing in the chatbot server 30.

A control program for defining the specific processing shown in FIG. 10 is stored in advance in the ROM 32 of the chatbot server 30, for example. The CPU 31 of the chatbot server 30 reads the control program stored in the ROM 32 and executes the specific processing. Here, a case of taking a procedure of posting an image to be printed to a talk room first in a case where the user prints an image will be described as an example. Therefore, explanation will be given on the assumption that at least one image is posted to the talk room by any user participating in the group chat before the specific processing shown in FIG. 10.

In step S100, the CPU 31 determines whether or not a file including an execution instruction, which is an instruction to print an image, has been posted to the talk room. Hereinafter, for convenience of explanation, the "file including an execution instruction that is an instruction to print an image" will be simply referred to as an "execution instruction". A term used for the execution instruction is set in advance. For example, in a case where information "print" is posted, the CPU 31 recognizes that there is an execution instruction.

In a case where an execution instruction is not posted, the determination processing of step S100 is repeatedly executed to monitor posting of an execution instruction from the user.

In step S110, the CPU 31 stores the posting time at which the posting of the execution instruction detected in step S100 has been performed, as a reference time, in the RAM 33.

In step S120, the CPU 31 determines whether or not there is an image posted at a time earlier than the posting time of the execution instruction detected in step S100, which is an image posted by the same user as the user who has posted the execution instruction and which is the latest image that is posted within a period T1 from the posting time of the execution instruction and has the shortest interval from the posting time of the execution instruction. Hereinafter, the image posted by the same user as the user who has posted the execution instruction, which is the latest image that is posted within a specific period (in this case, "period T1") from the posting time of the reference information (in this case, "execution instruction") and has the shortest interval from the posting time of the reference information, is referred to as an "adjacent image".

Here, the "period T1" is a period for defining the range of an image to be printed according to the execution instruction detected in step S100, and the CPU 31 includes an image, which is posted within the period T1 backward from the posting time of the execution instruction, as a print target. In a case where the interval between the posting time of the image and the posting time of the execution instruction is too long, the probability that the posted image is an image to be printed is reduced, compared with a case where the user posts an execution instruction immediately after posting the image.

For example, in a case where an execution instruction is posted after several days from the posting of an image to the talk room by the user, it is not clear whether or not the user really desires to print the posted image. Therefore, by setting a period, for which the posted image may be regarded as a print target according to the execution instruction, as the period T1, printing of an image that the user does not desire to print is suppressed. The period T1 is an example of the first period according to the present exemplary embodiment.

In a case where the interval to the adjacent image posted at a time earlier than the reference time is less than the period T1, the process proceeds to step S130.

In step S130, the CPU 31 determines whether or not another execution instruction, which is posted by the same user as the user who has posted the execution instruction detected in step S100 and is different from the execution instruction detected in step S100 during a period from the execution instruction to the posting time of the adjacent image, has been posted.

In a case where there is another execution instruction during a period from the execution instruction detected in step S100 to the posting time of the adjacent image, the adjacent image is included as a print target according to another execution instruction. Therefore, printing of an image posted before the posting of the execution instruction is already performed according to another execution instruction. Therefore, the CPU 31 checks whether or not another execution instruction has been posted during the period from the execution instruction detected in step S100 to the posting time of the adjacent image.

In a case where another execution instruction is not posted during the period from the execution instruction detected in step S100 to the posting time of the adjacent image, the process proceeds to step S140.

In this case, the adjacent image is an image that the user posts with the intention of printing, and the CPU 31 adds the adjacent image as a print target in step S140 since the adjacent image is an image that has not yet been printed.

In a case where the number of images posted by the user is one, the CPU 31 may immediately start control to execute printing of the image added as a print target in step S140, but the user may post a plurality of images. Therefore, the CPU 31 further checks whether or not an image to be printed has been posted.

Therefore, in step S150, the CPU 31 stores the posting time of an adjacent image added last as a print target in step S140, as a new reference time, in the RAM 33.

In step S160, the CPU 31 determines whether or not there is an image posted at a time earlier than the reference time, which is an image posted by the same user as the user who has posted the execution instruction and which is the latest image that is posted within a period T2 from the reference time and has the shortest interval from the reference time, that is, whether or not there is an adjacent image of the image posted at the reference time.

Here, the "period T2" is a period for defining the range of an image to be printed according to the execution instruction detected in step S100, and the CPU 31 also includes an image, which is posted within the period T2 backward from the posting time of the image to be printed, as a print target. In this manner, a plurality of images are added as print targets by one execution instruction. The period T2 is an example of the second period according to the present exemplary embodiment.

In a case where the interval to the adjacent image posted at a time earlier than the reference time is less than the period T2, the process proceeds to step S170.

In a case where there is another execution instruction, which is different from the execution instruction detected in step S100, during a period from the posting time of the image posted at the reference time to the posting time of the adjacent image, the adjacent image is included as a print target according to another execution instruction. Therefore, printing of an image posted before the posting of the adjacent image is already performed according to another execution instruction. Therefore, for example, it is preferable that the CPU 31 checks whether or not another execution instruction has been posted during the period from the posting time of the image posted at the reference time to the posting time of the adjacent image.

Accordingly, in step S170, the CPU 31 determines whether or not another execution instruction has been posted during the period from the posting time of the image posted at the reference time to the posting time of the adjacent image. In a case where another execution instruction has not been posted during the period from the posting time of the image posted at the reference time to the posting time of the adjacent image, the process proceeds to step S140 to add the adjacent image as a print target. In step S150, the posting time of the image added last as a print target is set as the reference time.

On the other hand, in a case where it is determined that the interval to the adjacent image posted at the time earlier than the reference time exceeds the period T2 in the determination processing of step S160 and a case where it is determined that another execution instruction has been posted during the period from the posting time of the image posted at the reference time to the posting time of the adjacent image in the determination processing of step S170, the process proceeds to step S180.

In step S180, the CPU 31 controls the image forming apparatus 40, which is associated with the user who has posted the execution instruction in the talk room in which the user participates, to print the image set as a print target according to the standard print settings associated with the user who has posted the execution instruction with reference to the correspondence table shown in FIG. 7 that is used in the case of group chat.

In step S190, the CPU 31 deletes the information of the image set as a print target, which is included in the posting of the next execution instruction, from the RAM 33.

That is, by repeatedly executing steps S140 to S170 by the CPU 31, not only images included within the period T1 from the posting time of the execution instruction but also images posted within the period T2 from the image set as a print target, which is a period until another execution instruction is posted, are sequentially set as print targets.

On the other hand, in a case where it is determined that the interval to the adjacent image posted at the time earlier than the reference time exceeds the period T1 in the determination processing of step S120 and a case where it is determined that another execution instruction has been posted during the period from the execution instruction detected in step S100 to the posting time of the adjacent image in the determination processing of step S130, the process proceeds to step S200.

This case means that the execution instruction has been posted by the user but there is no image to be printed.

Therefore, in step S200, the CPU 31 posts information prompting the user to post an image to the talk room, and ends the specific processing shown in FIG. 10. In addition, while participating in the group chat, the CPU 31 resumes the specific processing shown in FIG. 10 to monitor posting of the next execution instruction by the user.

In the case of group chat, in addition to posting an image to the talk room by the user, the chatbot server 30 executes printing of the image by posting the execution instruction by the same user as the user who has posted the image. That is, the conditions for starting control to execute printing in the group chat are set more strictly than in the individual chat.

For the chatbot server 30, posting of an image to the talk room and posting of an execution instruction in the group chat are the conditions set to execute printing of the image, and the posting of an execution instruction is an example of the second conditions according to the present exemplary embodiment. In order to execute the printing of the image in the group chat, it is necessary to post the execution instruction in addition to the posting of the image. Even in a case where the execution instruction is posted, printing of the image is not executed unless the image is posted. Accordingly, the posting of the image can also be said to be necessary conditions for posting the execution instruction.

In the specific processing in the individual chat shown in FIG. 8, execution of printing is started in step S50 after a specified time has passed from the posting of an image to the talk room. On the other hand, in the specific processing of the group chat shown in FIG. 10, in a case where an image is posted to the talk room and an execution instruction is posted, processing for waiting for the elapse of time such as the specific processing in the individual chat is not executed, and the CPU 31 executes each processing from step S100 to step S170 and then starts the execution of printing immediately in step S180.

That is, in the specific processing in the individual chat, the time until the control to execute printing of an image is actually started after the conditions for starting the printing of the image are satisfied is longer than in the specific processing in the group chat. The time required for the CPU 31 to execute each processing from step S100 to step S170 of the specific processing shown in FIG. 10 is an example of the second time according to the present exemplary embodiment.

There is no limitation on the lengths of the periods T1 and T2, and the period T1 is set to, for example, a length required until the posting of the execution instruction is finished from the posting of the image by the user. The period T2 is set to, for example, a length required until the posting of the next image is finished from the posting of the image by the user. Since an operation of selecting an image is included, the time required to select an image to be printed from a plurality of images and post the image to the talk room tends to be longer than the time required to simply post the execution instruction. Therefore, for example, it is preferable to set the period T1 to be shorter than the period T2.

Figure 11:
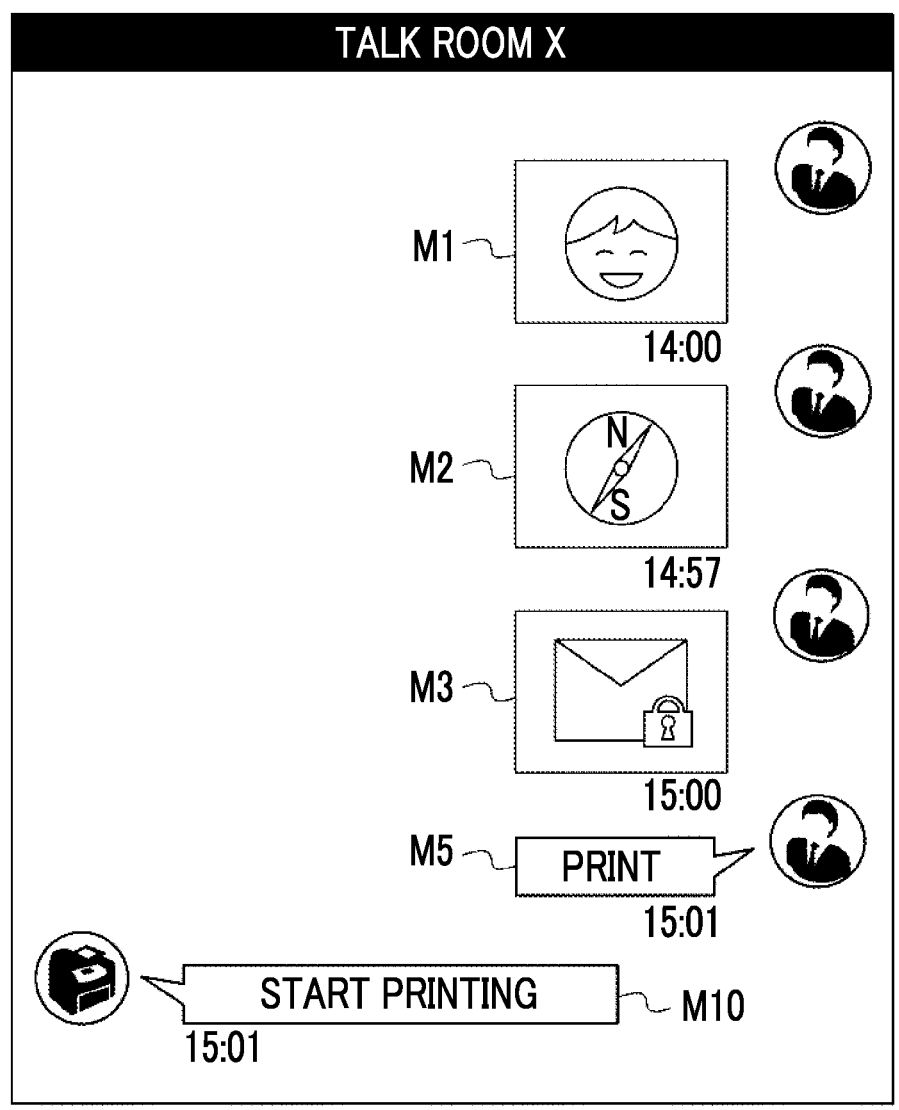
FIG. 11 is a diagram showing an example of a talk room in which a group chat is performed.

FIG. 11 is a diagram showing an example of a talk room displayed on the screen of the user terminal 10 of a user participating in the group chat in a case where the specific processing in the group chat shown in FIG. 10 is executed. As an example, the following explanation will be given on the assumption that the period T1 is set to three minutes and the period T2 is set to five minutes.

For example, in a case where the user A posts the image M1 at 14:00, posts an image M2 at 14:57, posts an image M3 at 15:00, and then posts information M5 of "print" as an execution instruction at 15:01, the chatbot server 30 starts control to execute printing.

In this case, the interval between the posting time of the execution instruction and the posting time of the image M3 is less than the period T1, and the interval between the posting time of the image M3 and the posting time of the image M2 is less than the period T2. However, the interval between the posting time of the image M2 and the posting time of the image M1 exceeds the period T2. Therefore, the chatbot server 30 starts control to execute printing with the images M2 and M3 as print targets. That is, printing of the image M1 is not performed.

As shown in FIG. 11, in the case of starting control to execute printing, for example, the chatbot server 30 may post the information M10 for notifying the user of the processing status of the chatbot server 30, such as "start printing", to the talk room.

Also in the group chat, before the control to execute printing is started, the chatbot server 30 may post information for inquiring of the user about print settings to be applied. In a case where the user posts information using the standard print settings, the chatbot server 30 controls the image forming apparatus 40 to print an image according to the standard print settings associated with the user. On the other hand, in a case where the user posts information designating print settings different from the standard print settings, the chatbot server 30 controls the image forming apparatus 40 to print an image according to the print settings designated by the user.

Figure 12:
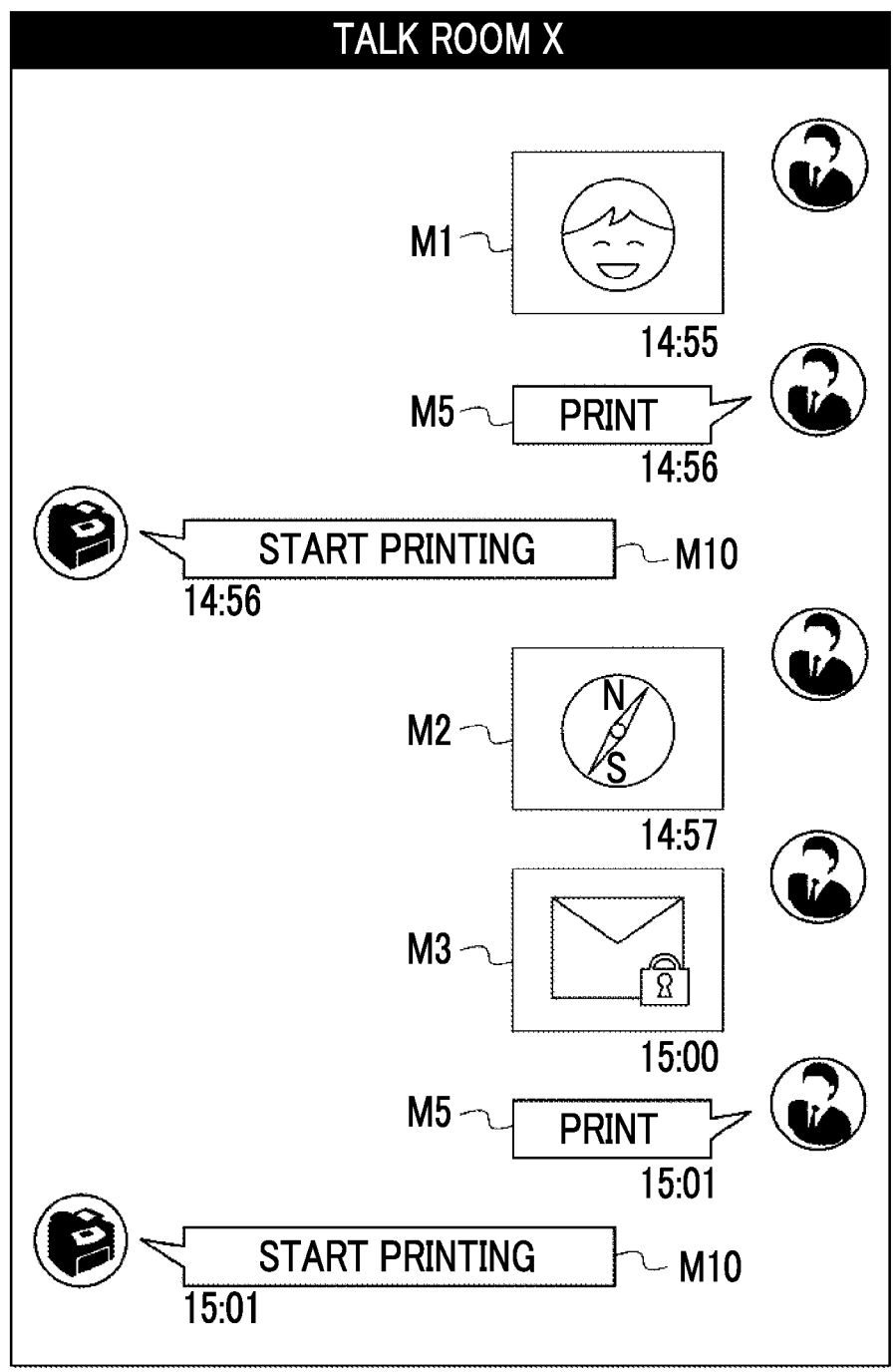
FIG. 12 is a diagram showing an example of a talk room in a case where a plurality of execution instructions are posted in a group chat.

FIG. 12 is a diagram showing an example of another talk room in a case where the specific processing of the group chat shown in FIG. 10 is executed.

For example, it is assumed that the user A posts the image M1 at 14:55 and posts the information M5 of "print" as an execution instruction at 14:56. Then, it is assumed that the user A posts the image M2 at 14:57, posts the image M3 at 15:00, and then posts the information M5 of "print" as an execution instruction at 15:01.

First, the chatbot server 30 starts control to execute printing according to an execution instruction at 14:56. In this case, since the interval between the posting time of the execution instruction posted at 14:56 and the posting time of the image M1 is less than the period T1, the chatbot server 30 starts control to execute printing with the image M1 as a print target.

Then, the chatbot server 30 starts control to execute printing according to an execution instruction at 15:01. In this case, the interval between the posting time of the execution instruction posted at 15:01 and the posting time of the image M3 is less than the period T1, and the interval between the posting time of the image M3 and the posting time of the image M2 is less than the period T2. On the other hand, since the interval between the posting time of the image M2 and the posting time of the image M1 is less than the period T2 but another execution instruction is posted between the image M2 and the image M1, the image M1 is not included as a print target according to the execution instruction at 15:01. Therefore, the chatbot server 30 starts control to execute printing with the images M2 and M3 as print targets.

Figure 13:
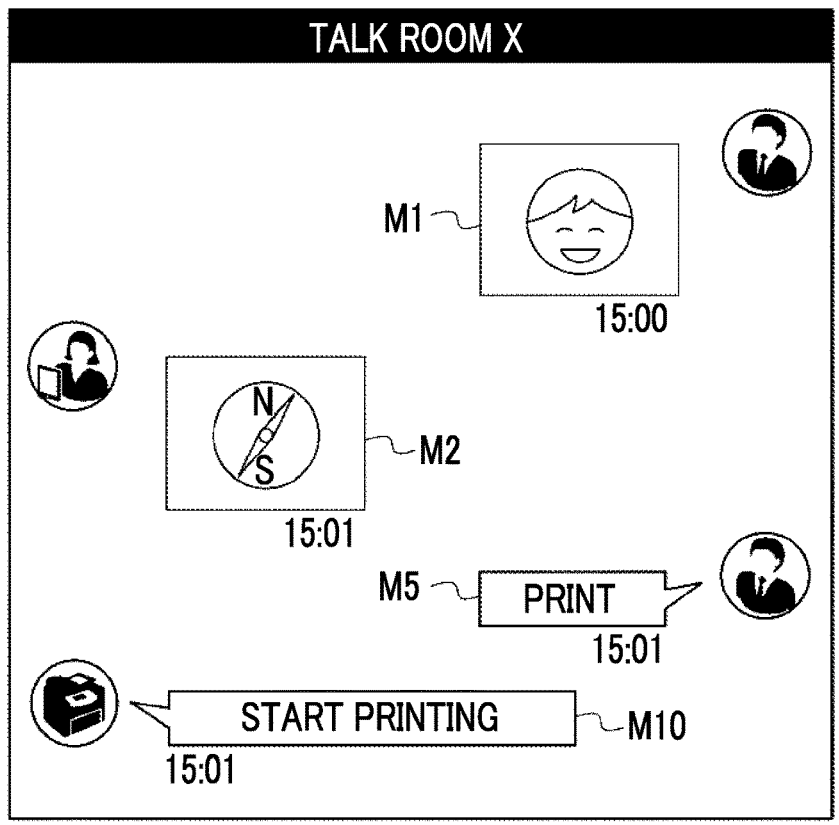
FIG. 13 is a diagram showing an example of a talk room in a case where a user different from a user who has posted an execution instruction posts an image in a group chat.

FIG. 13 is a diagram showing an example of another talk room in a case where the specific processing of the group chat shown in FIG. 10 is executed.

For example, it is assumed that the user A posts the image M1 at 15:00, the user B different from the user A posts the image M2 at 15:01, and then the user A posts the information M5 of "print" as an execution instruction at 15:01.

The chatbot server 30 starts control to execute printing according to the execution instruction at 15:01. In this case, since the interval between the posting time of the execution instruction and the posting time of the image M2 is less than the period T1 but the user who has posted the image M2 and the user who has posted the execution instruction are different persons, the image M2 is not included as a print target according to the execution instruction. On the other hand, since the interval between the posting time of the execution instruction and the posting time of the image M1 is less than the period T1 and the user who has posted the image M1 and the user who has posted the execution instruction are the same person, the chatbot server 30 starts control to execute printing with the image M1 as a print target.

Figure 14:
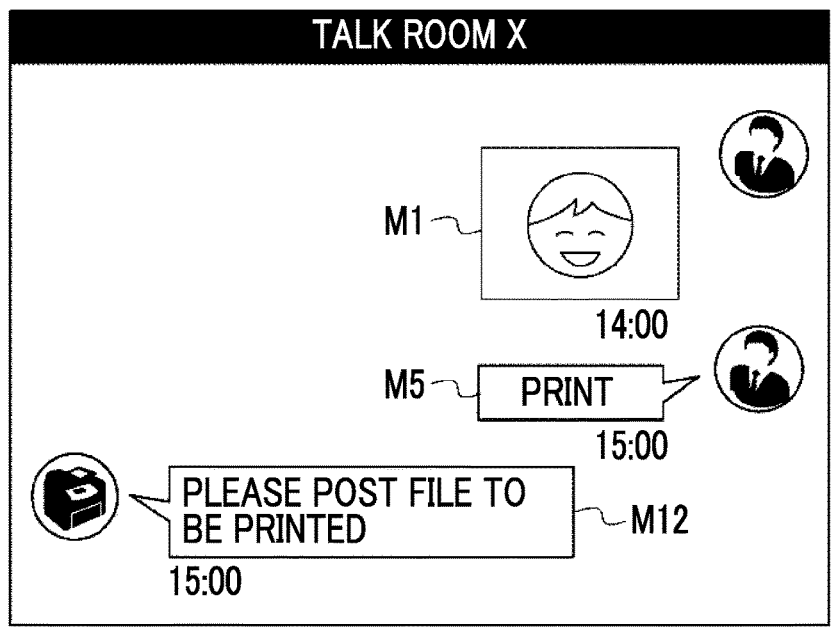
FIG. 14 is a diagram showing an example of a talk room in a case where an execution instruction is not posted within a period T1 in a group chat.

FIG. 14 is a diagram showing an example of another talk room in a case where the specific processing of the group chat shown in FIG. 10 is executed.

For example, it is assumed that the user A posts the image M1 at 14:00 and posts the information M5 of "print" as an execution instruction at 15:00. In this case, since the interval between the posting time of the execution instruction posted at 15:00 and the posting time of the image M1 exceeds the period T1, an execution instruction is posted by the user, but an image to be printed is not present. Therefore, the chatbot server 30 posts information M12 prompting the user to post an image, such as "please post a file to be printed", to the talk room.

The processing of the chatbot server 30 in a case where the execution instruction is posted by the user but an image to be printed is not present is not limited to the posting of information prompting the user to post an image.

For example, in a case where an execution instruction is not posted by the user who has posted an image during the period T1 from the posting of the image to the talk room, the chatbot server 30 may post information for inquiring of the user about the necessity of printing, such as "do you want to print the file? (Y/N)", to the talk room after the period T1 has passed.

In a case where the user posts the information of "Y" in response to the inquiry of the chatbot server 30, the chatbot server 30 starts the process from step S140 in FIG. 10, and starts control to execute printing with the image M1 as a print target. On the other hand, in a case where the user posts the information of "N" in response to the inquiry of the chatbot server 30, the specific processing shown in FIG. 10 is ended.

As shown in FIG. 14, even in a case where an execution instruction is posted by the user but it is determined that there is no image to be printed since the posting interval of an image exceeds the period T1 or the period T2, the chatbot server 30 may post information for inquiring of the user about the necessity of printing, such as "do you want to print the file? (Y/N)", to the talk room.

Up to now, an example of specific processing applied in the case of taking the procedure of posting an image to be printed to the talk room first in a case where the user prints an image in the group chat has been described. In addition to this, the chatbot server 30 also corresponds to a procedure of posting an image to be printed after posting a print instruction to a talk room first in a case where the user prints an image. Hereinafter, an example of specific processing corresponding to the procedure will be described.

Figure 15:
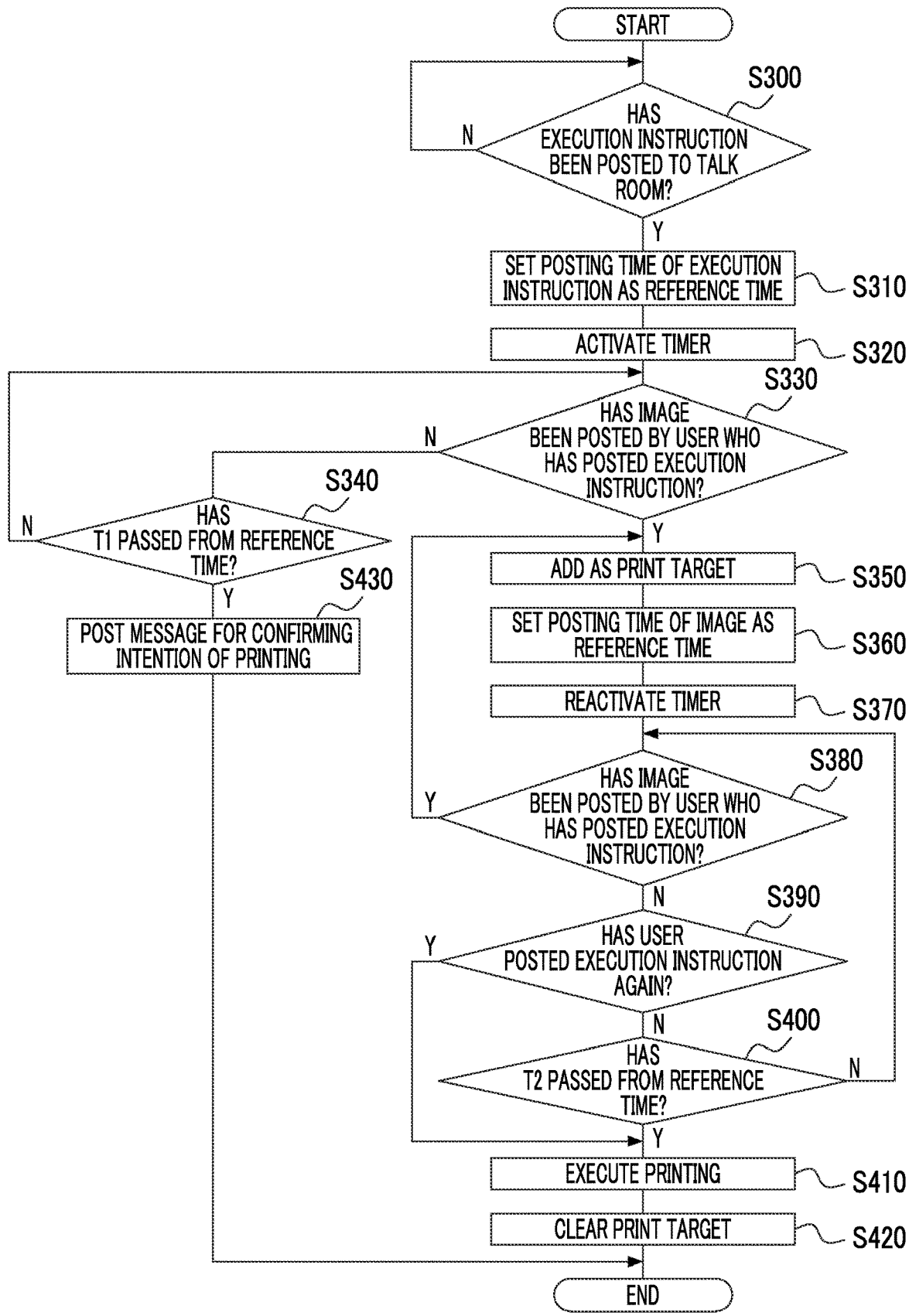
FIG. 15 is a flowchart showing another example of the flow of specific processing executed in the order of posting of an execution instruction and posting of an image in a group chat.

FIG. 15 is a flowchart showing an example of the flow of specific processing executed by the CPU 31 in a case where the chatbot server 30 participates in a group chat. The specific processing shown in FIG. 15 is an example of specific processing in the chatbot server 30.

A control program for defining the specific processing shown in FIG. 15 is stored in advance in the ROM 32 of the chatbot server 30, for example. The CPU 31 of the chatbot server 30 reads the control program stored in the ROM 32 and executes the specific processing.

In step S300, the CPU 31 determines whether or not an execution instruction has been posted to the talk room. In a case where an execution instruction is not posted, the determination processing of step S300 is repeatedly executed to monitor posting of an execution instruction from the user. On the other hand, in a case where an execution instruction is posted, the process proceeds to step S310.

In step S310, the CPU 31 stores the posting time at which the posting of the execution instruction detected in step S300 has been performed, as a reference time, in the RAM 33.

In step S320, the CPU 31 activates a timer for measuring the elapsed time from the reference time. As described in step S30 of FIG. 8, activation of the timer is realized by using, for example, a timer function built into the CPU 31.

In step S330, the CPU 31 determines whether or not an image has been posted to the talk room by the same user as the user who has posted the execution instruction detected in step S300. In a case where an image is not posted, the process proceeds to step S340.

In step S340, the CPU 31 refers to the value of the timer activated in step S320 to determine whether or not the period T1 has passed from the reference time, that is, whether or not the period T1 has passed from the posting time of the execution instruction. In a case where the period T1 has not passed from the reference time, the process proceeds to step S330 to determine whether or not an image has been posted to the talk room again. That is, by repeatedly executing steps S330 and S340, the CPU 31 monitors whether or not an image is posted by the same user as the user who has posted the execution instruction detected in step S300 within the period T1 set after the reference time.

In a case where an image is not posted by the same user as the user who has posted the execution instruction detected in step S300 within the period T1 from the reference time, that is, in a case where it is determined that the period T1 has passed from the reference time in the determination processing of step S340, the process proceeds to step S430.

In this case, the user has posted an execution instruction but has not posted an image to be printed. Therefore, in step S430, the CPU 31 posts information for inquiring whether or not the user has an intention to print an image to the talk room, and ends the specific processing shown in FIG. 15. In addition, while participating in the group chat, the CPU 31 resumes the specific processing shown in FIG. 15 to monitor posting of the next execution instruction by the user.

On the other hand, in a case where it is determined that an image has been posted by the same user as the user who has posted the execution instruction detected in step S300 in the determination processing of step S330, the process proceeds to step S350.

In this case, an image is posted within the period T1 from the posting time of the execution instruction. Therefore, in step S350, the CPU 31 stores the image posted by the same user as the user who has posted the execution instruction detected in step S300, as a print target, in the RAM 33. The image set as a print target is an image posted by the same user as the user who has posted the execution instruction, which is the latest image that is posted within a specific period (in this case, "period T1") from the posting time of the reference information (in this case, "execution instruction") and has the shortest interval from the posting time of the reference information. Accordingly, the image set as a print target satisfies the requirements for the "adjacent image".

In a case where the number of images posted by the user is one, the CPU 31 may immediately start control to execute printing of the image added as a print target in step S350. However, it is conceivable to post a plurality of images to be printed by the user. Therefore, the CPU 31 also includes images consecutively posted by the user as print targets.

Therefore, in step S360, the CPU 31 stores the posting time of an image added last as a print target in step S350, as a reference time, in the RAM 33.

In step S370, the CPU 31 reactivates the timer for measuring the elapsed time from the reference time to start the measurement of the elapsed time.

In step S380, the CPU 31 determines again whether or not a new image has been posted to the talk room by the same user as the user who has posted the execution instruction detected in step S300. In a case where a new image is posted, the new image can be considered to be an image that the user has posted with the intention of printing. Therefore, the process proceeds to step S350 to add the new image as a print target. In a case where the new image is added as a print target, the posting time of the image newly added in step S360 is set as the reference time, and the timer for measuring the elapsed time from the reference time is reactivated in step S370.

On the other hand, in a case where it is determined that a new image has not been posted in the determination processing of step S380, the process proceeds to step S390.

In a case where another execution instruction different from the execution instruction detected in step S300 is posted to the talk room by the same user as the user who has posted the execution instruction detected in step S300, another execution instruction is an execution instruction for an image posted after another execution instruction. On the other hand, in a case where another execution instruction is not posted to the talk room, a possibility that the user who has posted the execution instruction detected in step S300 will post a new image to be printed still remains.

Therefore, in step S390, the CPU 31 determines whether or not another execution instruction different from the execution instruction detected in step S300 has been posted to the talk room by the same user as the user who has posted the execution instruction detected in step S300. In a case where another execution instruction is not posted, the process proceeds to step S400 to continuously monitor the posting of a new image.

In step S400, the CPU 31 refers to the value of the timer reactivated in step S370 to determine whether or not the period T2 has passed from the reference time, that is, whether or not the period T2 has passed from the posting time of the last posted image. In a case where the period T2 has not passed from the reference time, the process proceeds to step S380 in which the CPU 31 determines again whether or not a new image has been posted to the talk room by the same user as the user who has posted the execution instruction detected in step S300.

On the other hand, in a case where it is determined that another execution instruction has been posted in the determination processing of step S390 and it is determined that the period T2 has passed from the posting time of the last posted image in the determination processing of step S400, the process proceeds to step S410.

In step S410, the CPU 31 controls the image forming apparatus 40, which is associated with the user who has posted the execution instruction in the talk room in which the user participates, to print the image set as a print target according to the standard print settings associated with the user who has posted the execution instruction with reference to the correspondence table shown in FIG. 7 that is used in the case of group chat.

Then, in step S420, the CPU 31 deletes the information of the image set as a print target, which is included in the posting of the next execution instruction, from the RAM 33, and ends the specific processing shown in FIG. 15.

That is, by repeatedly executing steps S380 to S400 by the CPU 31, not only images included within the period T1 from the posting time of the execution instruction but also new images posted within the period T2 from the image set last as a print target, which is a period until another execution instruction is posted, are sequentially set as print targets.

Also in the group chat of the procedure of posting an image to be printed after the print instruction is posted to the talk room, the chatbot server 30 performs printing of the image according to the posting of the execution instruction by the same user as the user who has posted the image in addition to the posting of the image to the talk room by the user.

The CPU 31 stops the activated timer in the case of ending the specific processing shown in FIG. 15.

Figure 16:
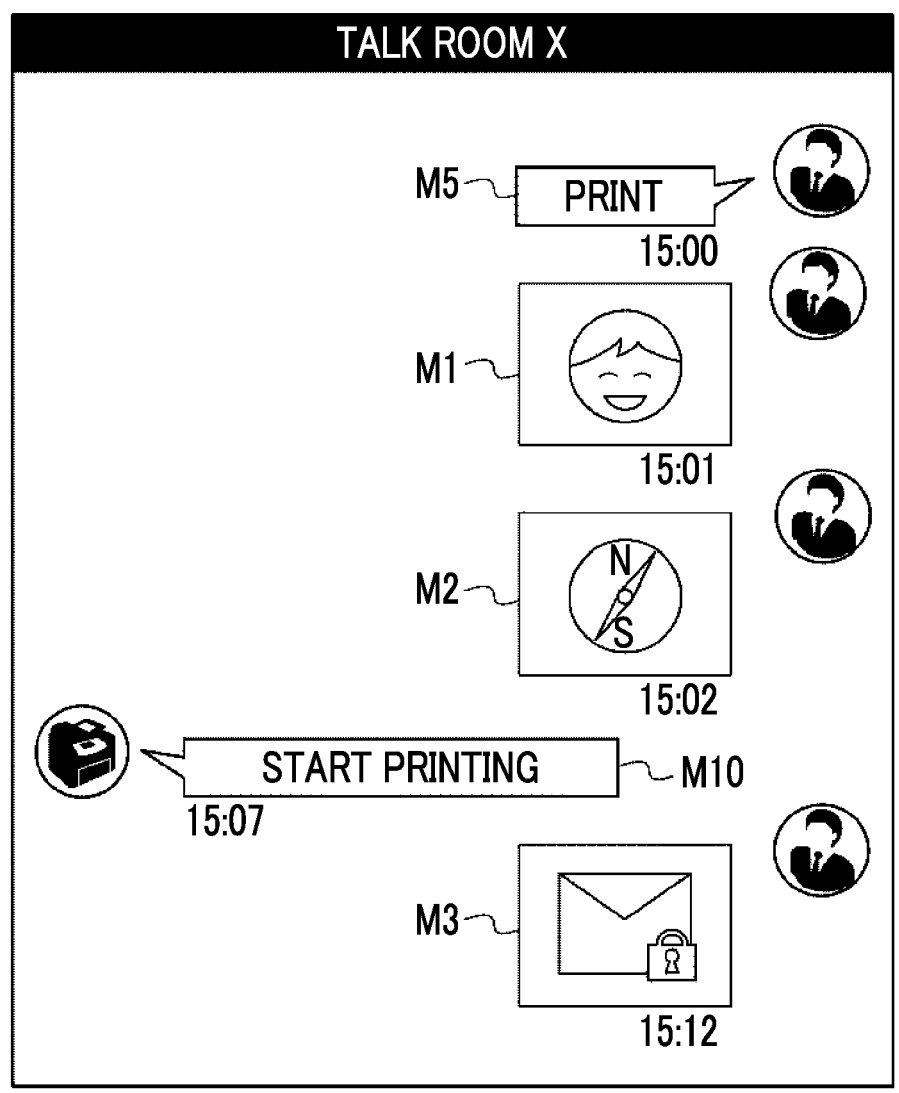
FIG. 16 is a diagram showing an example of a talk room in a case where a plurality of images are posted in a group chat.

FIG. 16 is a diagram showing an example of a talk room displayed on the screen of the user terminal 10 of a user participating in the group chat in a case where the specific processing in the group chat shown in FIG. 15 is executed.

For example, it is assumed that the user A posts the information M5 of "print" as an execution instruction at 15:00 and then the user A similarly posts the image M1 at 15:01, posts the image M2 at 15:02, and posts the image M3 at 15:12.

In this case, the interval between the posting time of the execution instruction and the posting time of the image M1 is less than the period T1, and the interval between the posting time of the image M1 and the posting time of the image M2 is less than the period T2. However, the interval between the posting time of the image M2 and the posting time of the image M3 exceeds the period T2. Therefore, in a case where the period T2 has passed since the image M2 is posted, the chatbot server 30 starts control to execute printing with the images M1 and M2 as print targets. That is, printing of the image M3 is not performed.

As already described with reference to FIG. 11, in the case of starting control to execute printing, for example, the chatbot server 30 may post the information M10 for notifying the user of the processing status of the chatbot server 30, such as "start printing", to the talk room. Also in the group chat, before the control to execute printing is started, the chatbot server 30 may post information for inquiring of the user about print settings to be applied.

Figure 17:
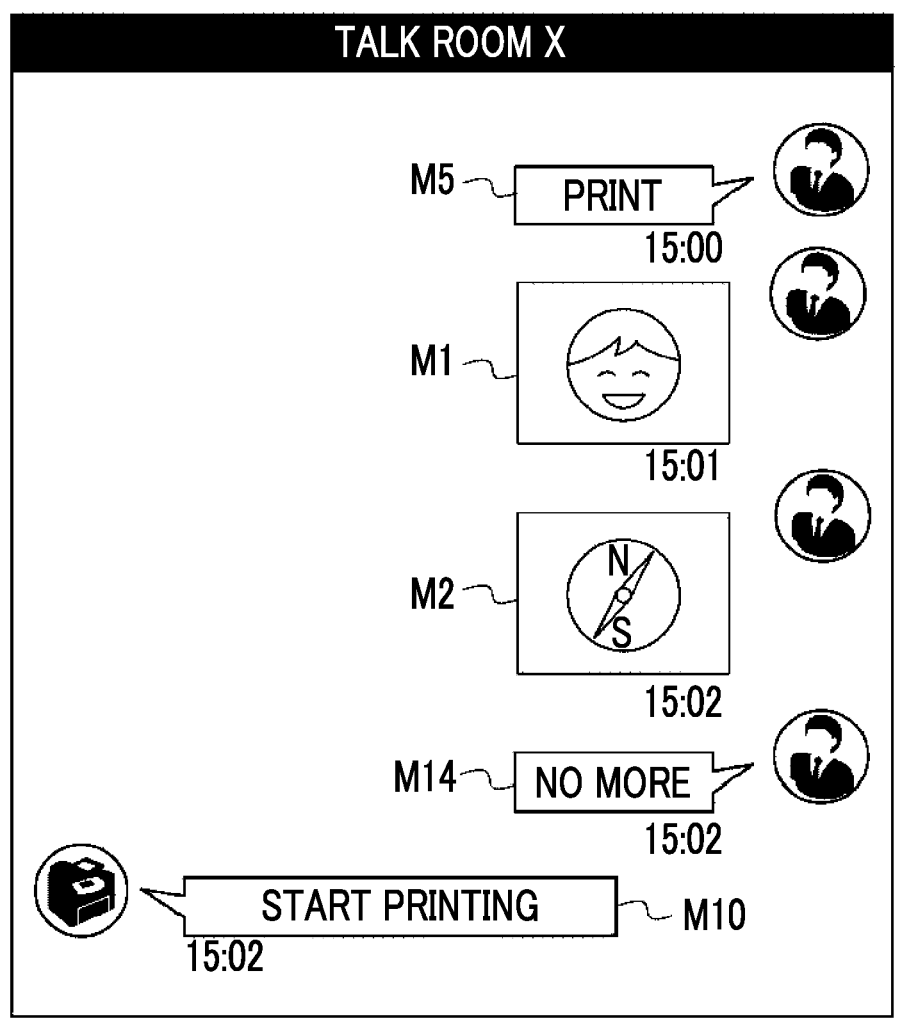
FIG. 17 is a diagram showing an example of a talk room in a case where posting end information is posted in a group chat.

FIG. 17 is a diagram showing an example of another talk room in a case where the specific processing of the group chat shown in FIG. 15 is executed.

In the specific processing of the group chat shown in FIG. 15, the control to execute printing is not started until the period T1 or the period T2 passes even though the user posts the image in order to respond to posting of a plurality of images by the user. Therefore, before the period T1 or the period T2 passes, the user may post information indicating that posting of an image to be printed has ended (hereinafter, referred to as "posting end information").

For example, it is assumed that the user A posts the information M5 of "print" as an execution instruction at 15:00 and then the user A similarly posts the image M1 at 15:01, posts the image M2 at 15:02, and posts information M14 of "no more" as the posting end information at 15:02.

In this case, in a case where there is no posting of the information M14, the chatbot server 30 starts control to execute printing with the images M1 and M2 as print targets in a case where the period T2 has passed since the image M2 is posted. However, the range of the image to be printed is determined by posting the information M14. Therefore, even before the period T2 passes since the image M2 is posted, the chatbot server 30 can start control to execute printing with the images M1 and M2 as print targets immediately after the information M14 is posted.

The posting end information is stored in advance in the storage 34. In FIG. 17, "no more" is used as the posting end information. However, other expressions, such as "end", may be stored in the storage 34 as the posting end information.

The chatbot server 30 analyzes the content of the information posted by the user using a known natural language analysis method, such as morphological analysis, and determines that posting end information has been posted in a case where the content of the analyzed information matches the posting end information stored in the storage 34.

Figure 18:
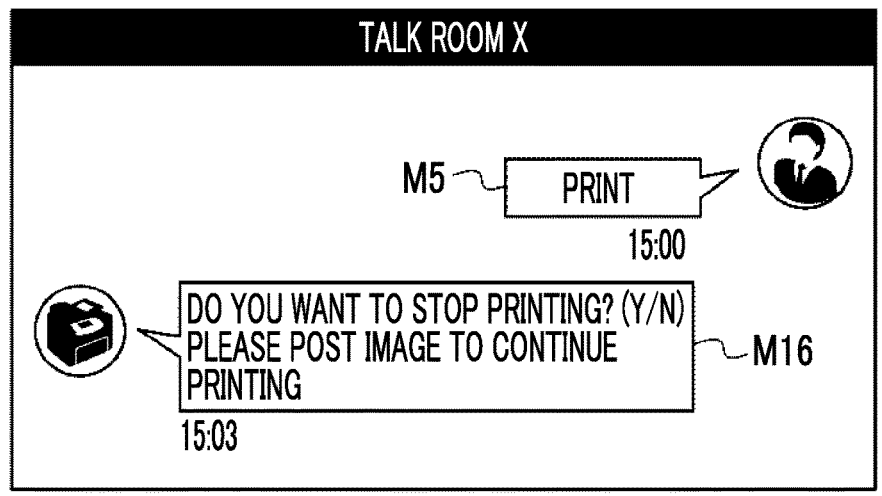
FIG. 18 is a diagram showing an example of a talk room in a case where an image to be printed is not posted in a group chat.

FIG. 18 is a diagram showing an example of another talk room in a case where the specific processing of the group chat shown in FIG. 15 is executed.

For example, it is assumed that the user A posts the information M5 of "print" as an execution instruction at 15:00 and then no image is posted until the period T1 passes.

In this case, after the period T1 passes, step S430 in FIG. 15 is executed, and the chatbot server 30 posts information for inquiring whether or not the user A has an intention of printing an image to the talk room. In the example shown in FIG. 18, information M16 "do you want to stop printing? (Y/N) please post the image to continue printing" is posted to the talk room by the chatbot server 30.

In a case where the user posts the information of "Y" in response to the inquiry of the chatbot server 30, the chatbot server 30 sets the time at which the user has posted the information of "Y" as the reference time, and then starts processing from step S320 in FIG. 15. On the other hand, in a case where the user posts the information of "N" in response to the inquiry of the chatbot server 30, the specific processing shown in FIG. 15 is ended.

Figure 19:
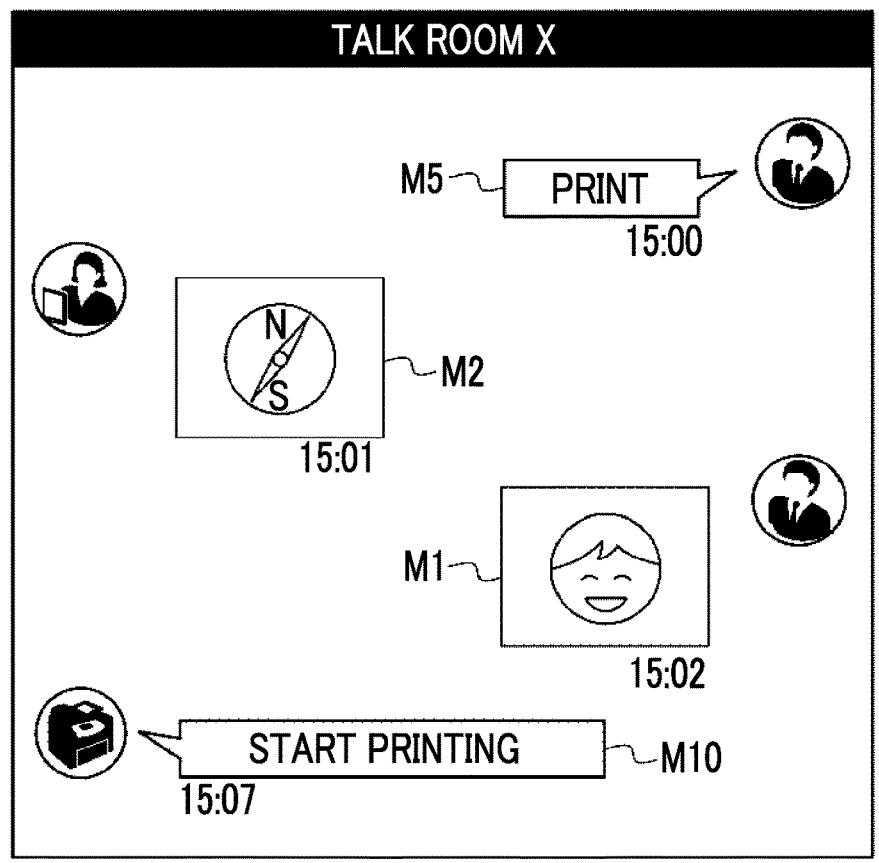
FIG. 19 is a diagram showing an example of a talk room in a case where a user different from a user who has posted an execution instruction posts an image in a group chat.

FIG. 19 is a diagram showing an example of another talk room in a case where the specific processing of the group chat shown in FIG. 15 is executed.

For example, it is assumed that the user A posts the information M5 of "print" as an execution instruction at 15:00 and then the user B who is a different person from the user A posts the image M2 at 15:01, and the user A posts the image M1 at 15:02.

In this case, the interval between the posting time of the execution instruction and the posting time of the image M2 is less than the period T1. However, since the user who has posted the image M2 is different from the user who has posted the execution instruction, the image M2 is not included as a print target. On the other hand, since the interval between the posting time of the execution instruction and the posting time of the image M1 is less than the period T1, the chatbot server 30 starts control to execute printing with the image M1 as a print target after the period T2 has passed since the image M1 is posted.

Figure 20:
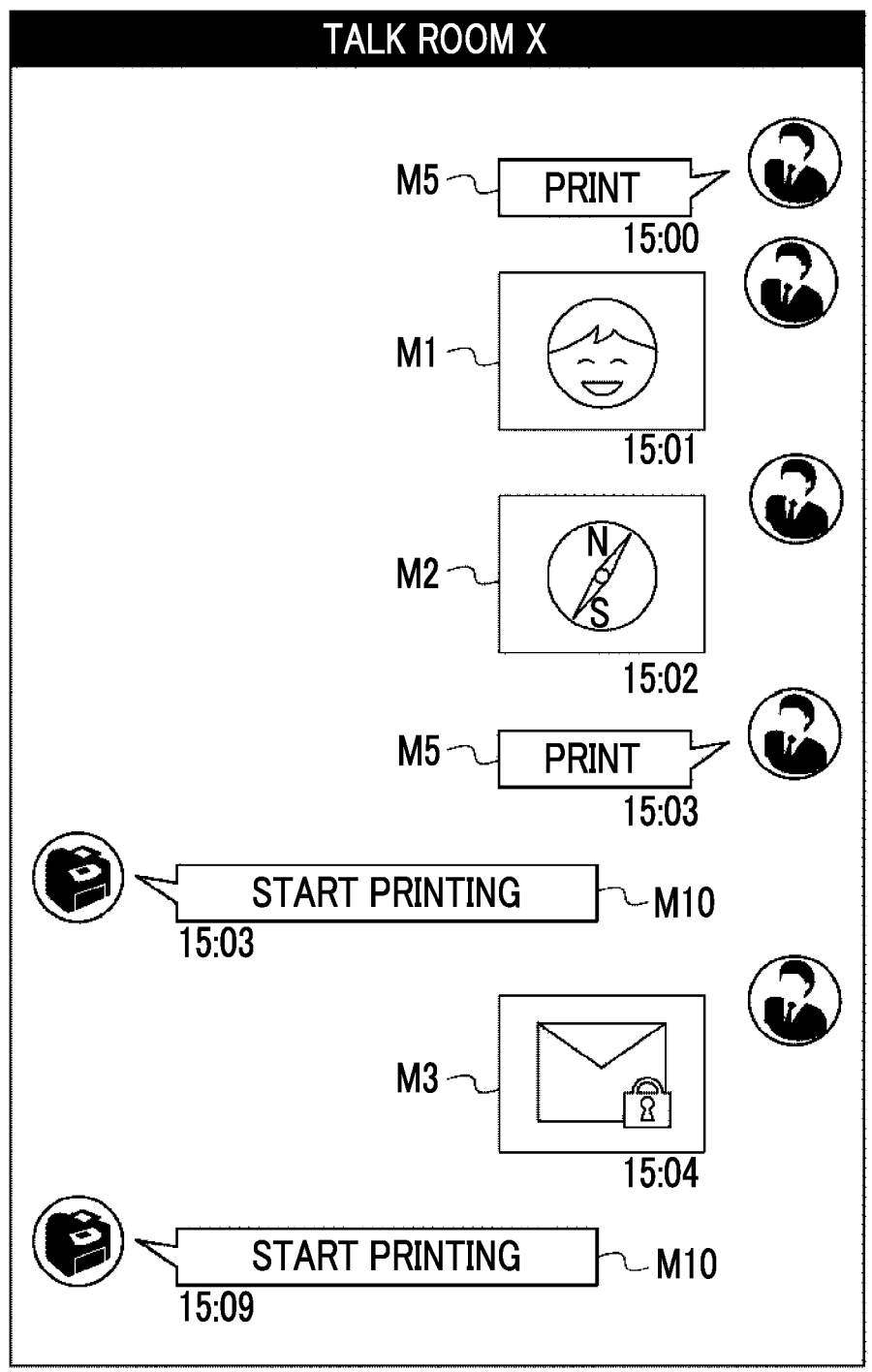
FIG. 20 is a diagram showing an example of a talk room in a case where a plurality of execution instructions are posted in a group chat.

FIG. 20 is a diagram showing an example of another talk room in a case where the specific processing of the group chat shown in FIG. 15 is executed.

For example, it is assumed that the user A posts the information M5 of "print" as an execution instruction at 15:00 and then the user A similarly posts the image M1 at 15:01 and post the image M2 at 15:02. Then, it is assumed that the user A posts the information M5 of "print" as an execution instruction at 15:03 and posts the image M3 at 15:04.

In this case, since the interval between the posting time of the execution instruction and the posting time of the image M1 is less than the period T1 and the interval between the posting time of the image M1 and the posting time of the image M2 is less than the period T2, the chatbot server 30 sets the images M1 and M2 as print targets. Thereafter, the information M5 that is another execution instruction different from the execution instruction posted at 15:00 is posted. Accordingly, even before the period T2 passes since the image M2 is posted, the chatbot server 30 starts control to execute printing with the images M1 and M2 as print targets.

In addition, since the interval between the information M5 posted at 15:03 and the posting time of the image M3 is less than the period T1, the chatbot server 30 sets the image M3 as a print target, and starts control to execute printing of the image M3 after the period T2 has passed since the image M3 is posted.

As described above, the chatbot server 30 according to the present exemplary embodiment has different conditions for starting control to execute printing between the individual chat and the group chat. In the group chat, since it is necessary to check whether or not the image posted by the user is an image addressed to the chatbot server 30, the conditions for executing printing are stricter than in the individual chat.

Second Exemplary Embodiment

As described above, the chatbot server 30 participating in the group chat starts control to execute printing in a case where an image is posted by the user and an execution instruction, which is an instruction to print the posted image, is posted by the same user as the user who has posted the image.

However, in a case where the attribute of an image posted by the user satisfies specific conditions, control to execute printing may be started by posting an image without posting an execution instruction.

In the present exemplary embodiment, the chatbot server 30 that starts the execution of printing according to the intention of the user even in a case where there is no posting of an execution instruction from the user in a group chat will be described.

An image posted to the talk room is stored in a storage region (hereinafter, referred to as an "album") provided in the storage 24 of the talk room server 20 so that users (including the chatbot server 30) who participate in the talk room later can refer to the image. The album is provided in the storage 24 so as to be associated with each talk room on a one-to-one basis.

In the storage 34 of the chatbot server 30, images posted by respective users after the chatbot server 30 participates in the talk room are stored as the history of the talk room.

That is, images stored in the album and images stored as the history are images shared among users participating in the talk room. "Image is shared" means that each user participating in the talk room can view the image.

In a case where an image shared by respective users participating in the talk room is posted to the talk room, the image is unlikely to be an image posted to any user participating in the talk room since the image is already shared by the users. That is, the probability of being an image posted to the chatbot server 30 is higher than the probability of being an image posted to any user.

Therefore, in the group chat, in a case where an image having an attribute of being shared among users participating in the talk room is posted, the chatbot server 30 starts control to execute printing without waiting for an execution instruction from the user.

Here, examples of the "attribute of an image" include not only items indicating the characteristics of the image itself, such as the size and the creation date and time of the image, but also information indicating how the image is used, such as how the image is used on what kind of scene. Therefore, information indicating whether or not the image is shared among the users participating in the talk room is included in the attribute of the image.

Next, the operation of the chatbot server 30 in a group chat, which controls the timing of executing printing according to the attribute of an image, will be described.

Figure 21:
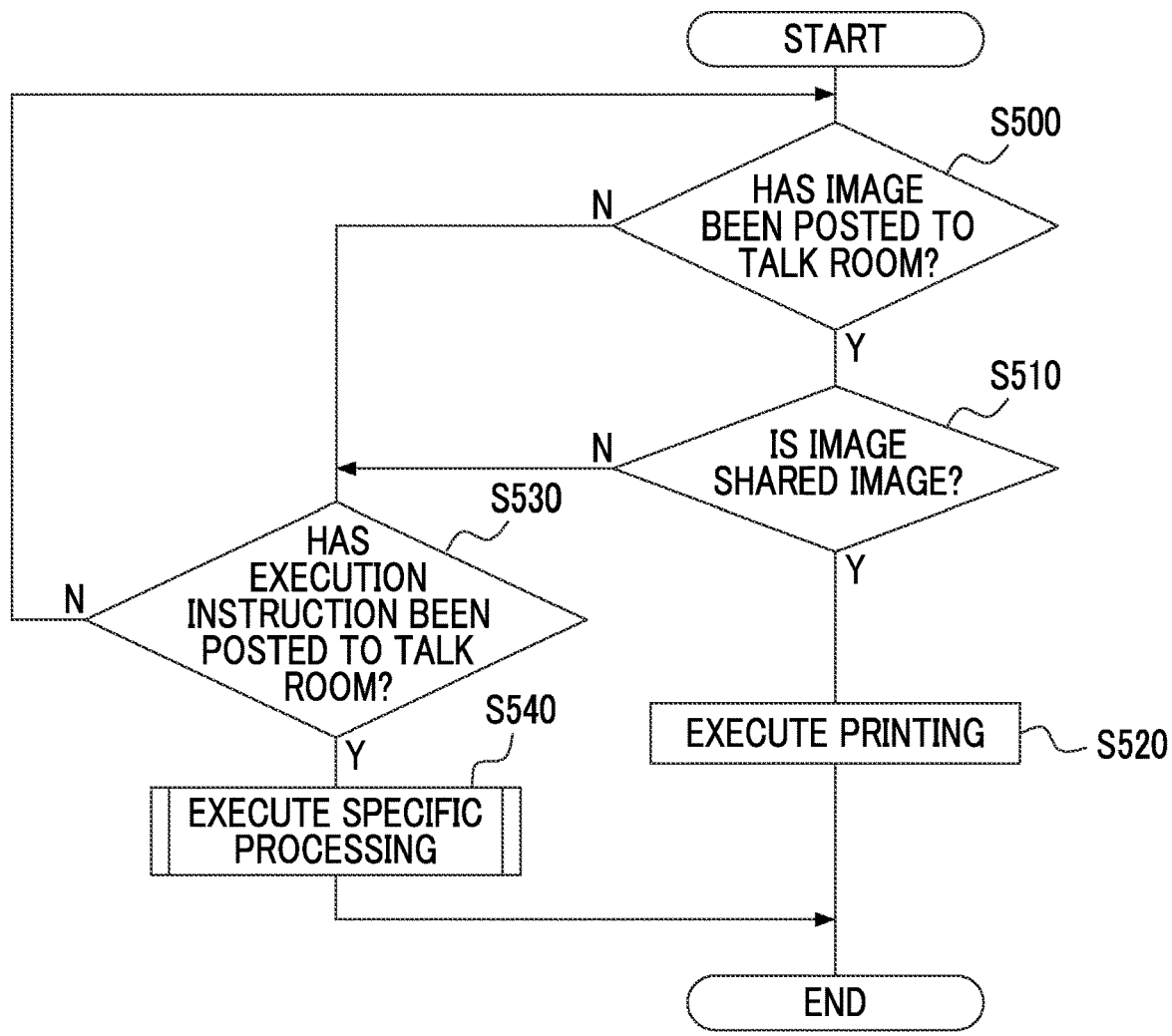
FIG. 21 is a flowchart showing another example of the flow of control processing executed based on the attribute of a posted image in a group chat.

FIG. 21 is a flowchart showing an example of the flow of control processing executed by the CPU 31 in a case where the chatbot server 30 participates in a group chat.

A control program for defining the control processing shown in FIG. 21 is stored in advance in the ROM 32 of the chatbot server 30, for example. The CPU 31 of the chatbot server 30 reads the control program stored in the ROM 32 and executes the control processing.

First, in step S500, the CPU 31 determines whether or not an image has been posted by any user participating in the talk room. In a case where an image has been posted, the process proceeds to step S510.

In step S510, the CPU 31 refers to at least one of the album associated with the talk room in which the chatbot server 30 participates or the history of the talk room to determine whether or not the posted image is an image (hereinafter, referred to as a "shared image") that is shared among the users participating in the group chat. Specifically, the CPU 31 determines that the posted image is a shared image in a case where the same image as the image detected in step S500 is included in at least one of the album associated with the talk room in which the chatbot server 30 participates or the history of the talk room.

That is, the shared image is a posted image that one of the users has already posted in the talk room in which the user participates.

Here, "images are the same" means, for example, that the file names of the images, the creators of the images, and the data amounts of the images are the same, but the criteria for determining whether or not images are the same are not limited thereto. For example, it is conceivable to modify the file name of an image after the user posts the image to the talk room and post the image with the modified file name again to the same talk room. Therefore, the CPU 31 may determine whether or not the images are the same by comparing the content of the images using a known image recognition method or pattern matching method.

In a case where the posted image is a shared image, the process proceeds to step S520.

In step S520, the CPU 31 starts control to execute printing of the posted image detected in step S500, and ends the control processing shown in FIG. 21. That is, in a case where the posted image is a shared image that is shared among the users participating in the group chat, the CPU 31 starts control to execute printing of the image even though the execution instruction is not posted.

On the other hand, in a case where it is determined that no image has been posted in the determination processing of step S500 and it is determined that the posted image is not a shared image in the determination processing of step S510, the process proceeds to step S530.

In step S530, the CPU 31 determines whether or not an execution instruction has been posted to the talk room. In a case where an execution instruction is not posted, the process proceeds to step S500. That is, until the image or the execution instruction is posted to the talk room, the determination processing of step S500 and the determination processing of step S530 are alternately performed to monitor posting from the user.

On the other hand, in a case where an execution instruction is posted, the process proceeds to step S540.

In step S540, the specific processing shown in FIG. 10 or FIG. 15 is executed.

For example, in a case where an execution instruction is posted after an image that is not a shared image is posted, the specific processing is executed from step S110 shown in FIG. 10. In a case where only an execution instruction is posted without posting an image, the specific processing is executed from step S310 shown in FIG. 15. That is, in a case where the posted image is not a shared image, the chatbot server 30 operates so as to respond to both the group chat of the procedure of posting the image to be printed after posting the print instruction to the talk room and the group chat of the procedure of posting the print instruction after posting the image to be printed to the talk room according to the posting order of the image and the execution instruction.

As described above, the control processing shown in FIG. 21 is ended. In addition, while participating in the group chat, the CPU 31 resumes the control processing shown in FIG. 21 to monitor posting of an image or an execution instruction to the talk room by the user.

Figure 22:
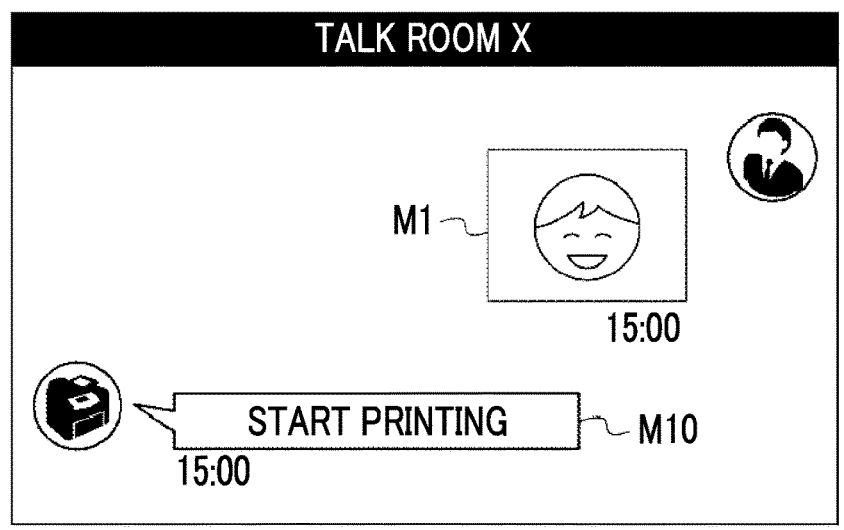
FIG. 22 is a diagram showing an example of a talk room in a case where a shared image is posted in a group chat.

FIG. 22 is a diagram showing an example of a talk room displayed on the screen of the user terminal 10 of a user participating in the group chat in a case where a shared image is posted from the user in the control processing in the group chat shown in FIG. 21.

For example, it is assumed that the user A has posted the image M1 that is a shared image at 15:00. In this case, since the posted image is a shared image, the chatbot server 30 immediately starts control to execute printing with the image M1 as a print target without waiting for posting of an execution instruction from the user A even though this is a group chat.

In the specific processing shown in FIGS. 10 and 15, determination as to whether or not the posted image is a shared image may be added to determination as to whether or not to add the posted image as a print target. The specific processing of FIGS. 10 and 15 starts the control to execute printing of an image in a case where the user posts the image and posts the execution instruction. However, it may be determined that an image has been posted in a case where a shared image is posted by the same user as the user who has posted the execution instruction. That is, in a case where the conditions in which the attribute of the posted image is a shared image are satisfied, the image is regarded as being posted. The conditions in which the attribute of the posted image is a shared image are an example of the third conditions according to the present exemplary embodiment.

In this case, since the content that the user desires to execute may also be checked from the attribute of the posted image, it is possible to execute an operation according to the intention of the user more accurately than in a case where it is determined that the user desires to print an image from the act of posting an image and the act of posting an execution instruction.

The chatbot server 30 according to the present exemplary embodiment controls the execution timing of the processing relevant to printing based on the conditions regarding whether or not the posted image is a shared image. However, determination as to whether or not to execute the processing relevant to printing may be performed by combining not only the attribute such as whether or not the image is a shared image but also other attributes. For example, it may be determined whether or not the creator of an image is the same person as the user who has posted the image, and the processing relevant to printing may be executed in a case where the creator of the image is the same person as the user who has posted the image.

Specific processing controlled by the chatbot server 30 so as to be executed by the information processing apparatus 40 is not limited to the processing relevant to printing. For example, processing, such as reservation of a hospital and Internet shopping, may be executed. In this case, conditions for starting to control the information processing apparatus 40 are set according to the content of the specific processing.

For example, in a case where the hospital designated by the user is a hospital that the user has already visited, the chatbot server 30 immediately starts the reservation. However, in a case where the hospital designated by the user is a hospital that the user has never visited, the chatbot server 30 inquires of the user about information for confirming whether or not the designated hospital is really OK, and starts the reservation in a case where information indicating permission is posted from the user.

Although the present invention has been described with reference to the exemplary embodiments, the present invention is not limited to the scope described in each exemplary embodiment. Various modifications or improvements can be added to each exemplary embodiment within the scope not deviating from the gist of the present invention, and forms after such modifications or improvements are also included in the technical scope of the present invention. For example, the order of processing may be changed without departing from the gist of the present invention.

In the present exemplary embodiment, a form of realizing the specific processing and the control processing by software has been described as an example. However, processes equivalent to the flowcharts shown in FIGS. 8, 10, 15, and 21 may be implemented in, for example, an application specific integrated circuit (ASIC), so that the processing by hardware is realized. In this case, the processing speed can be increased compared with a case where display processing is realized by software.

In the above exemplary embodiment, a form in which the control program is installed on the ROM 32 has been described. However, the present invention is not limited thereto. The control program according to the exemplary embodiment of the present invention can also be provided in a form stored in a computer readable storage medium. For example, the control program according to the exemplary embodiment of the present invention may be provided in a form recorded on an optical disc, such as a compact disc (CD)-ROM or a digital versatile disc (DVD)-ROM. Alternatively, the control program according to the exemplary embodiment of the present invention may be provided in a form recorded in a semiconductor memory, such as a universal serial bus (USB) memory or a flash memory. Alternatively, the chatbot server 30 acquires the control program according to the exemplary embodiment of the present invention from an external apparatus connected to the communication line through the communication I/F 37.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device, comprising:
a processor configured to:
detect a file being posted in a group chat, wherein the file includes an execution instruction of an image forming process;
determine whether the file is shared among a plurality of users participating in the group chat based on attribute of the file;
not to execute processing using the file in a case where the file posted from any user in the group chat, in which the plurality of users and a chatbot participate, is not shared among the users participating in the group chat; and
execute the processing using the file in a case where the file is shared among the users,
wherein the processing includes the image forming process on the file being posted and shared among the users participating in the group chat,
wherein the image forming process is a printing process by printing out the file posted in the group chat.

2. The control device according to claim 1,
wherein the processor is further configured to determine that the file being posted in the group chat is shared among the users participating in the group chat in a case where the file is the same file as an other file that is already posted in the group chat.

3. A non-transitory computer readable medium storing a control program causing a computer to function as:
the processor of the control device according to claim 1.

* * * * *